US008460109B2

(12) United States Patent
Bryson et al.

(10) Patent No.: US 8,460,109 B2
(45) Date of Patent: Jun. 11, 2013

(54) GAMING COMMUNITY MANAGEMENT AND PERSONALIZATION

(75) Inventors: Andy O. Bryson, San Rafael, CA (US); Richard Fishman, Alamo, CA (US)

(73) Assignee: IGT, Reno, NV (US)

( * ) Notice: Subject to any disclaimer, the term of this patent is extended or adjusted under 35 U.S.C. 154(b) by 1459 days.

(21) Appl. No.: 11/739,661

(22) Filed: Apr. 24, 2007

(65) Prior Publication Data

US 2008/0268959 A1 Oct. 30, 2008

(51) Int. Cl.
*A63F 13/10* (2006.01)
*A63F 13/12* (2006.01)

(52) U.S. Cl.
USPC .................................. 463/42; 463/25; 463/29

(58) Field of Classification Search
USPC .............................. 463/25, 42, 16, 29, 40, 41
See application file for complete search history.

(56) References Cited

U.S. PATENT DOCUMENTS

| | | | | |
|---|---|---|---|---|
| 5,762,552 | A | 6/1998 | Vuong et al. | |
| 5,980,384 | A | 11/1999 | Barrie | |
| 6,135,887 | A | 10/2000 | Pease et al. | |
| 6,264,561 | B1 | 7/2001 | Saffari et al. | |
| 6,409,077 | B1 | 6/2002 | Telesca et al. | |
| 6,645,077 | B2 | 11/2003 | Rowe | |
| 6,853,973 | B2 | 2/2005 | Mathews et al. | |
| 2003/0125973 | A1 | 7/2003 | Mathews et al. | |
| 2003/0216966 | A1 | 11/2003 | Saenz et al. | |
| 2004/0152511 | A1 | 8/2004 | Nicely et al. | |
| 2004/0185933 | A1 | 9/2004 | Nicely | |
| 2004/0242322 | A1 | 12/2004 | Montagna et al. | |
| 2005/0159200 | A1 | 7/2005 | Nicely et al. | |
| 2005/0176500 | A1 | 8/2005 | Mathews et al. | |
| 2009/0117989 | A1 * | 5/2009 | Arezina et al. | 463/20 |

OTHER PUBLICATIONS

Miltenberger et al., "Internet Remote Game Server", IGT, U.S. Appl. No. 11/598,260, filed Nov. 10, 2006.
William R. Brosnan, "Using a Gaming Machine as a Server", IGT, U.S. Appl. No. 09/595,798, filed Jun. 16, 2000.

* cited by examiner

*Primary Examiner* — Damon Pierce
(74) *Attorney, Agent, or Firm* — Neal, Gerber & Eisenberg LLP

(57) ABSTRACT

The present invention involves methods and devices for controlling many aspects of a player's gaming experience, including game themes presented, game denomination, pay models, content and promotions. Some implementations of the invention provide a casino operator the necessary tools to create subsets of customers, often referred to herein as "communities," and to control the gaming experiences of players in these communities. In some such implementations, communities may be created and/or modified according to various criteria, some of which may be weighted more heavily than others. Specific marketing messages, promotions, etc., may be provided to attract and retain players having similar characteristics and preferences.

28 Claims, 10 Drawing Sheets

500

GAMING COMMUNITY MANAGEMENT AND PERSONALIZATION

FIELD OF THE INVENTION

The present disclosure relates to devices, methods and networks involving wagering games.

BACKGROUND OF THE INVENTION

Gaming establishments are continually searching for new and innovative techniques to increase player patronage and profits, and to improve operations. (Although there are many types of gaming establishments, including casinos, cruise ships, riverboats, online casinos, etc., all types of gaming establishments may sometimes be referred to herein as "casinos." Moreover, the term "casino" may be used to mean a particular gaming establishment, a group of associated gaming establishments and/or an entity that owns one or more gaming establishments.)

A casino typically spends a great deal of time, money and effort in creating attractive, exciting and distinctive environments and game presentations. Attracting and retaining players is an ongoing challenge. Hierarchical player loyalty programs are widely used by casinos to enhance player loyalty, target promotions and comps, etc. Although current gaming environments and marketing efforts are adequate, it would be desirable to provide more versatile and exciting methods and devices.

SUMMARY OF THE INVENTION

The present invention involves methods and devices for controlling many aspects of a player's gaming experience, including game themes presented, game denomination, pay models, content and promotions. Some implementations of the invention provide a casino operator the necessary tools to create subsets of customers, often referred to herein as "communities," and to control the gaming experiences of players in these communities. In some such implementations, communities may be created and/or modified according to various criteria, some of which may be weighted more heavily than others. Specific marketing messages, promotions, etc., may be provided to attract and retain players having similar characteristics and preferences.

Some embodiments of the invention provide a gaming system, comprising: apparatus configured for determining a player community; apparatus configured for selecting wagering games and wagering game characteristics according to the player community; and apparatus for configuring a device to provide selected wagering games having selected wagering game characteristics. A selected wagering game characteristic may, for example, comprise at least one of volatility, pay table percentage, denomination and wager game presentation.

The device may, for example, comprise a wager gaming machine, such as a stationary electronic wager gaming machine or a portable wager gaming machine. Alternatively, the device may be a laptop computer, a desktop computer, a personal digital assistant, a cellular telephone, etc.

The determining apparatus may comprise at least one component of a player loyalty system. For example, the determining apparatus may comprise a player loyalty card reader and/or a server of a player loyalty system. The determining apparatus may comprise a user input device.

The player community may correspond to at least one criterion of player characteristic data and/or to a type of wagering game. Such player characteristic data may comprise, e.g., total handle data, loyalty tier data, account balance data, deposit data, stake per session data, tenure data, session number data, session frequency data, tournament fee data, games played data and/or account balance data. The gaming system may further comprise apparatus for weighting a first criterion more heavily than a second criterion.

The determining and selecting apparatus may comprise at least a server configured to perform the following tasks: receive player identification data; query a data structure comprising player identification data and corresponding player communities; determine the player community according to the player identification data; and download software to the device for providing the selected wagering games according to the selected wagering game characteristics.

The gaming system may further comprise apparatus for determining a device location. The selecting apparatus may be configured for selecting wagering games and/or wagering game characteristics according to the device location.

The gaming system may further comprise: apparatus for monitoring at least one criterion of a player's wagering game history; and apparatus for determining when the player's wagering game history indicates that the player should be migrated from a first player community to a second player community. The gaming system may further comprise means for causing a player to migrate from a first player community corresponding to first selected wagering games having first selected wagering game characteristics to a second player community corresponding to second selected wagering games having second selected wagering game characteristics.

Alternative implementations of the invention provide gaming methods. One such method includes these steps: determining a player community according to player identification data; selecting wagering games and wagering game characteristics corresponding to the player community; and configuring a device to provide selected wagering games having selected wagering game characteristics.

A selected wagering game characteristic may comprise volatility, pay table percentage, denomination and/or wager game presentation. The configuring step may comprise configuring a wager gaming machine. The determining step may comprises determining player identification data corresponding to a player loyalty system.

The player community may corresponds to at least one criterion of player characteristic data, such as total handle data, loyalty tier data, account balance data, deposit data, stake per session data, tenure data, session number data, session frequency data, tournament fee data, games played data and/or account balance data. The gaming method may involve weighting a first criterion more heavily than a second criterion. The player community may, for example, correspond to a type of wagering game.

The selecting step may comprise these steps: receiving the player identification data; determining the player community according to the player identification data; and downloading software to the device for providing the selected wagering games according to the selected wagering game characteristics.

The gaming method may also involve determining a device location. The selecting step may involve selecting wagering games and/or wagering game characteristics according to the device location.

The gaming method may further comprise: monitoring at least one criterion of a player's wagering game history; and determining when the player's wagering game history indicates that the player should be migrated from a first player community to a second player community. The gaming method may further comprise migrating a player from a first player community, corresponding to first selected wagering games having first selected wagering game characteristics, to a second player community corresponding to second selected wagering games having second selected wagering game characteristics.

The present invention provides hardware that is configured to perform the methods of the invention, as well as software to control devices to perform these and other methods. For example, methods of this invention may be represented (at least in part) as program instructions and/or data structures, databases, etc., that can be provided on computer-readable media.

Accordingly, some embodiments of the invention provide software stored in a machine readable medium. The software may comprise instructions for controlling at least one device in a gaming network to perform the following operations: provide at least one graphical user interface indicating player characteristics, wagering games and wagering game characteristics; determine selected player characteristic data, selected wagering games and selected wagering game characteristics; define a player community according to selected player characteristics, selected wagering games and selected wagering game characteristics; and provide selected wagering games having selected wagering game characteristics to devices operated by players of the player community. A selected wagering game characteristic may, for example, comprise volatility, pay table percentage, denomination and/or wager game presentation.

At least one graphical user interface may provide at least one field for naming a player community. Similarly, at least one graphical user interface may provide at least one field for naming a gaming establishment. The software may comprise instructions for personalizing a website according to player communities.

The software may further comprise instructions for controlling at least one device in the gaming network to define a plurality of player communities according to selected player characteristic data, selected wagering games and/or selected wagering game characteristics. At least one graphical user interface may provide at least one field for migrating a player from a first player community to a second player community. At least one graphical user interface may provide at least one field for providing information regarding players' migration between player communities.

The software may comprise instructions for controlling at least one device in the gaming network to provide at least one graphical user interface for indicating a weighting function to be applied to selected player characteristic data. Player characteristic data may, for example, comprise at least one of total handle data, loyalty tier data, account balance data, deposit data, stake per session data, tenure data, session number data, session frequency data, tournament fee data, games played data and/or account balance data.

The software may comprise instructions for controlling at least one device in the gaming network to limit wager gaming for players in a player community to wagering games and/or wagering game characteristics selected for the player community. The software may comprise instructions for controlling content provided to a player's device in the gaming network according to content selected for a corresponding player community. The software may comprise instructions for controlling images provided to a player's device in the gaming network according to images selected for a corresponding player community. The software may comprise instructions for directing marketing communications to devices in the gaming network according to player communities of players using the devices.

Alternative embodiments of the invention provide a server that includes the following elements: a network interface system configured for receiving player identification data and gaming device identification data from a device; a memory system for storing player identification data, corresponding player community data, machine identification data and player community software; and a logic system. The logic system may be configured to perform the following tasks: determining a player community according to the player identification data; locating player community software corresponding to the player community and the gaming device identification data, the player community software configured for providing selected wagering games according to corresponding wagering game characteristics; and downloading the player community software to the device, via the network interface system. A selected wagering game characteristic may, for example, comprise volatility, pay table percentage, denomination and/or wager game presentation.

These and other features of the present invention will be presented in more detail in the following detailed description of the invention and the associated figures.

DESCRIPTION OF SOME EXAMPLES OF THE INVENTION

Figure 1:
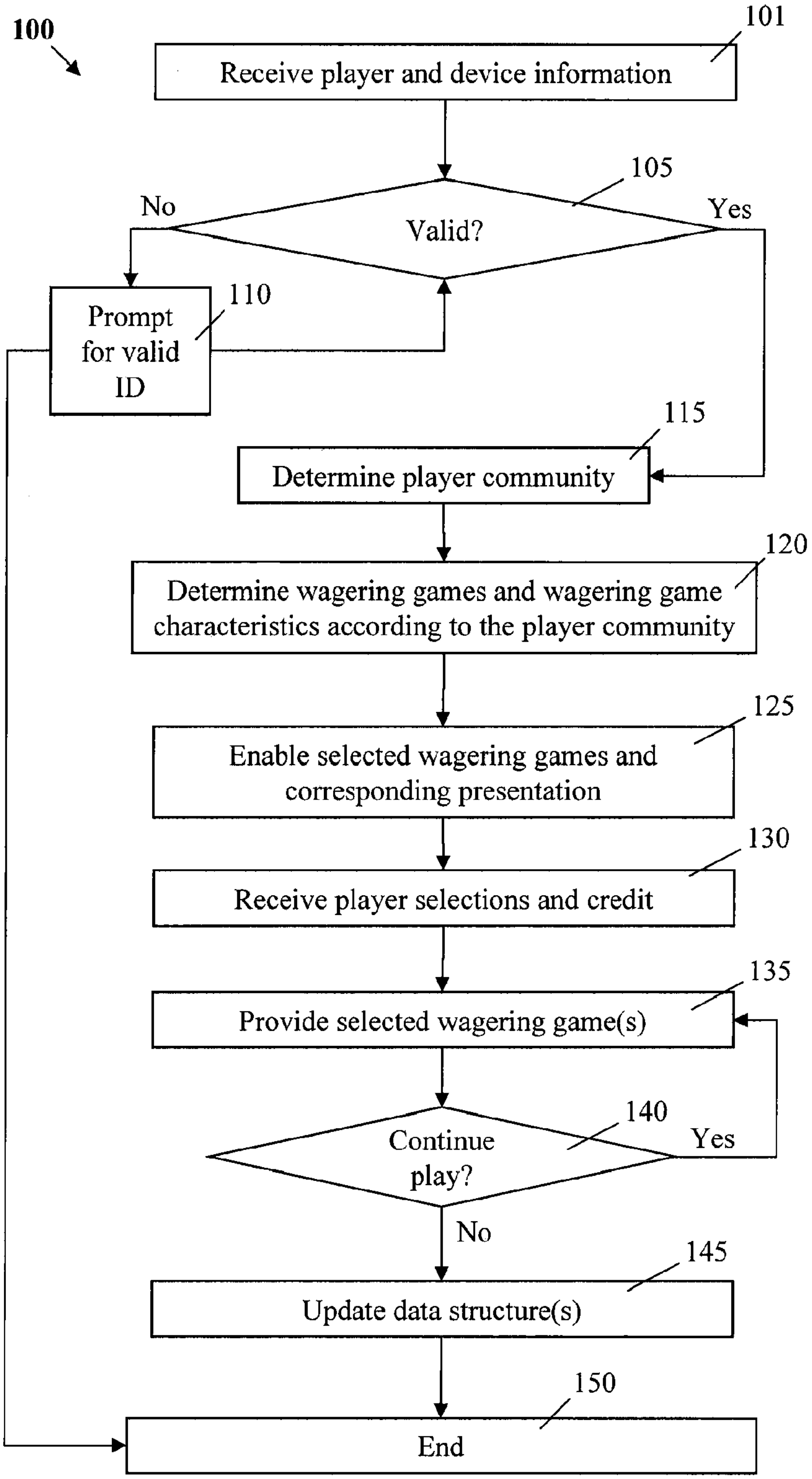
FIG. 1 is a flow chart that outlines some methods of the invention.

Reference will now be made in detail to some specific examples of the invention, including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well-known process operations have not been described in detail in order not to obscure unnecessarily the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted.

Similarly, the steps of the methods shown and described herein are not necessarily all performed (and in some implementations are not performed) in the order indicated. Moreover, some implementations of the methods discussed herein may include more or fewer steps than those shown or described.

Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, an indicated connection does not necessarily mean a direct, unimpeded connection unless otherwise noted.

Many aspects of the present invention involve methods and devices for gaming community management and personalization. Some embodiments of the invention allow an operator to control many aspects of a player's gaming experience, such as wagering game themes, wagering game attributes (e.g., pay models, denominations, etc.), promotions and content. Some such embodiments involve controlling networked devices from a central system. These embodiments may include server-based gaming implementations provided by a "bricks and mortar" casino or an online casino.

Some aspects of the invention provide tools that allow an operator to perform player analysis and segmentation, allowing for the flexible creation and/or modification of player communities. An operator may be able to specify not only site content, but actual game play to the appropriate community. The operator (and/or the central system) may provide wagering games, wagering game attributes, etc., according to a player's community, location and/or device type.

Some general methods of the invention will now be described with reference to FIG. 1. Flow chart 100 of FIG. 1 will be used to describe some methods of providing wagering games and other features according to player communities. Following this description are some examples of how player communities may be created and managed, with reference to FIGS. 2 through 6.

In step 101, player information is received. Preferably, information regarding the device(s) used by the player are also received in step 101. The manner in which player and/or device information is received may vary substantially according to the implementation. For example, in an online gaming context, a user may submit a user identification code and a password to a device controlled by an online casino. Alternatively, in a "bricks and mortar" casino environment, a player's information may be obtained via components of the casino's player loyalty system. For example, player may insert a player loyalty card in a card reader associated with an electronic gaming machine, enter a player loyalty member's code on a user input device, etc. In some implementations, a player loyalty device, such as a "smart card," a dongle or the like may be scanned, e.g., by a radio frequency identification device ("RFID") reader associated with a gaming machine.

The present invention may be practiced with various types of verification, authentication, privacy and security measures. Preferred implementations of the invention provide secure communications between networked devices, including but not limited to the ability to identify requesters on a network reliably. If the player's device is outside a "bricks and mortar" casino environment, the device's location should be determined. Determining the device's location allows an online casino to identify the corresponding jurisdiction and to comply with the regulations of that jurisdiction. Moreover, it is important to verify the identity of the player, in part to ensure that underage players are not participating in wagering games. Some methods and devices described in U.S. patent application Ser. No. 10/981,435, entitled "LOCATION AND USER IDENTIFICATION FOR ONLINE GAMING", and filed on Nov. 3, 2004, which is hereby incorporated by reference, may advantageously be used in connection with the present invention. Such devices include, but are not limited to, location detection devices and biometric devices (such as retinal scanners, hand and/or fingerprint scanners, voice recognition devices and the like).

Accordingly, step 105 may involve not only player identification, but also device authentication and/or location determination. The player may be allowed at least one additional opportunity to satisfy an authentication/verification challenge if an initial attempt fails. (Step 110.)

If the player and/or device can satisfy the authentication/verification challenge of step 105, the player's community is determined. This process may be performed, e.g., by a device (such as a server) of a central system, with reference to a database of players and player communities. If a player has not previously been assigned to a player community, step 115 may involve assigning the player to a community according to player information, e.g., according to a player's indicated wager gaming preferences, indicated experience level and/or other factors.

Although some implementations may allow a player to be a member of more than one community at a time, some preferred implementations allow a player to be a member of only one community at a time. However, as described elsewhere herein, a player may "migrate" from one community to another. In some implementations, a player's community may correspond to some aspect of a player loyalty program.

However, the player communities of the present invention are not limited according to criteria used in prior art player loyalty systems. Instead, the present invention provides greater flexibility in the creation of player communities and allows such communities to be based on a wider range of criteria.

For example, a player community may be determined, at least in part, according to a preferred wagering game type. There may be, e.g., poker communities, blackjack communities, slot communities, bingo communities, roulette communities, etc. Player community formation may take into account players' wagering game experience level in a wagering game type. For example, there may be one or more player communities for beginning poker players and other communities for more experienced poker players.

Some player communities may be defined, at least in part, according to preferred game theme types within a wagering game type. For example, even if it is known that a player is interested in slot games, there are currently hundreds of slot games available. Accordingly, slot player communities may be defined, at least in part, according to preferences for certain slot games over others, e.g., a preference for Cleopatra™ slot games over Little Green Men™ slot games. Denomination preferences may also been taken into account.

Figure 2:
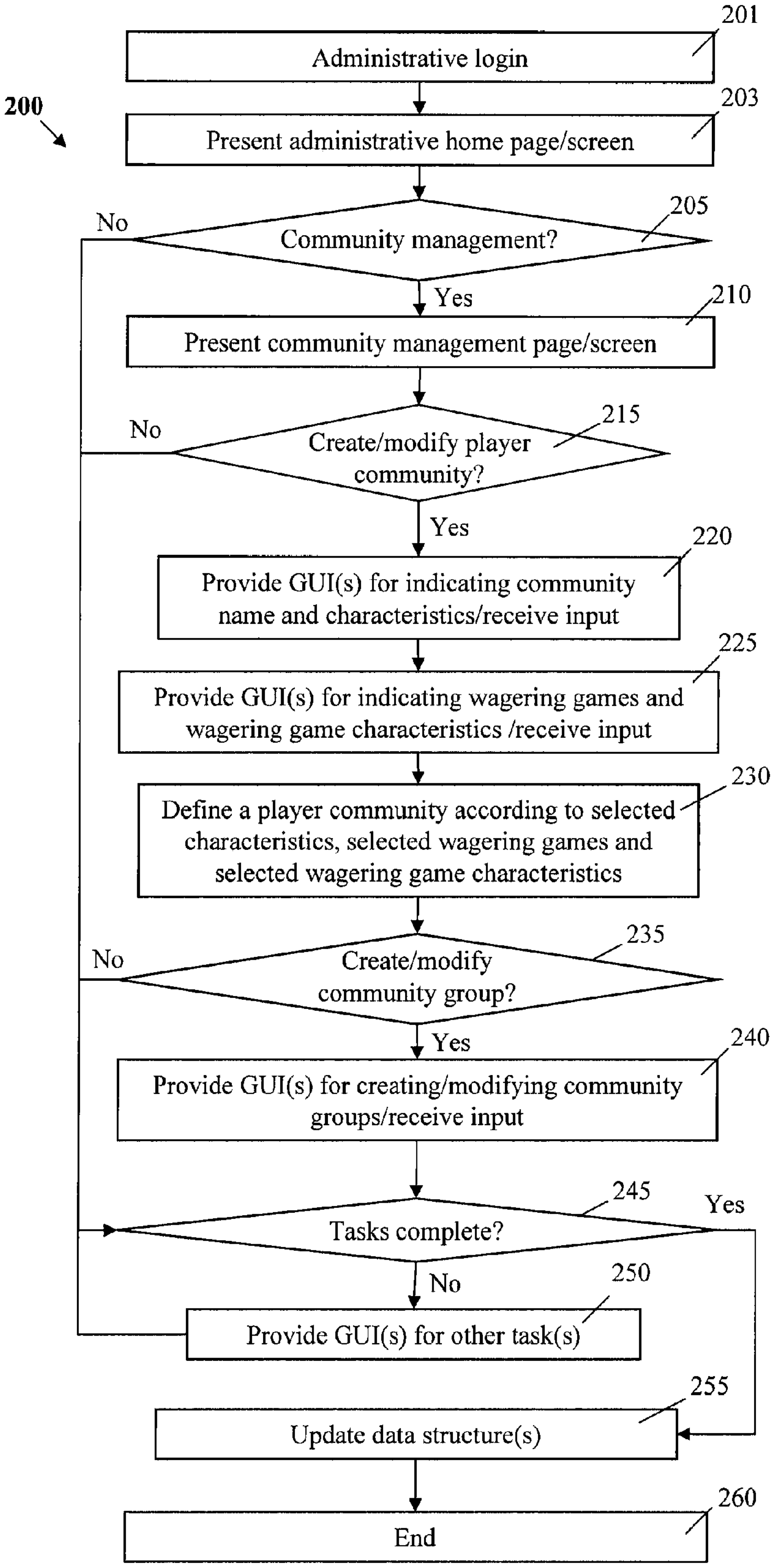
FIG. 2 is a flow chart that outlines alternative methods of the invention.
Figure 3:
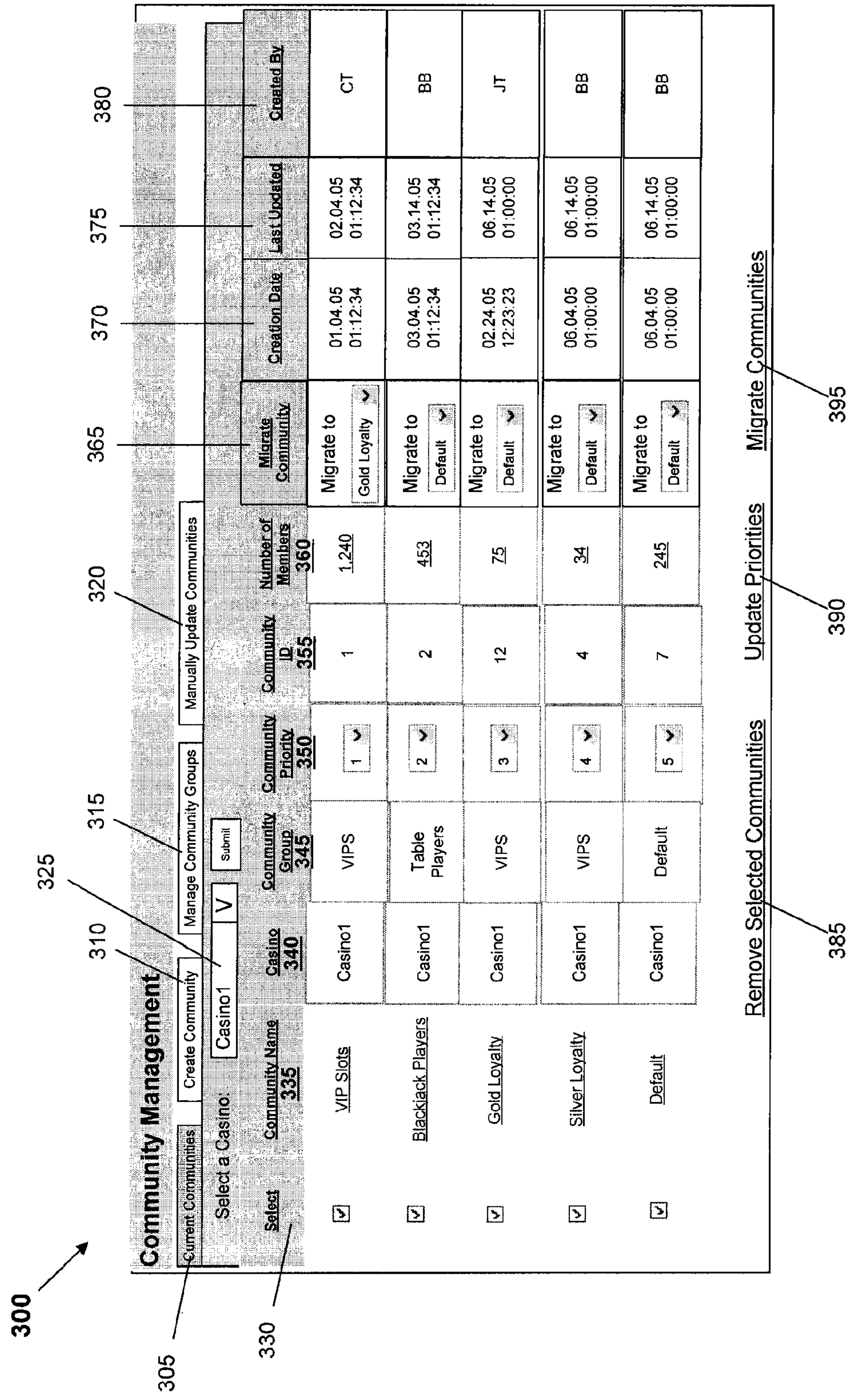
FIG. 3 is an example of a graphical user interface that may be used to implement some methods of the invention.
Figure 4:
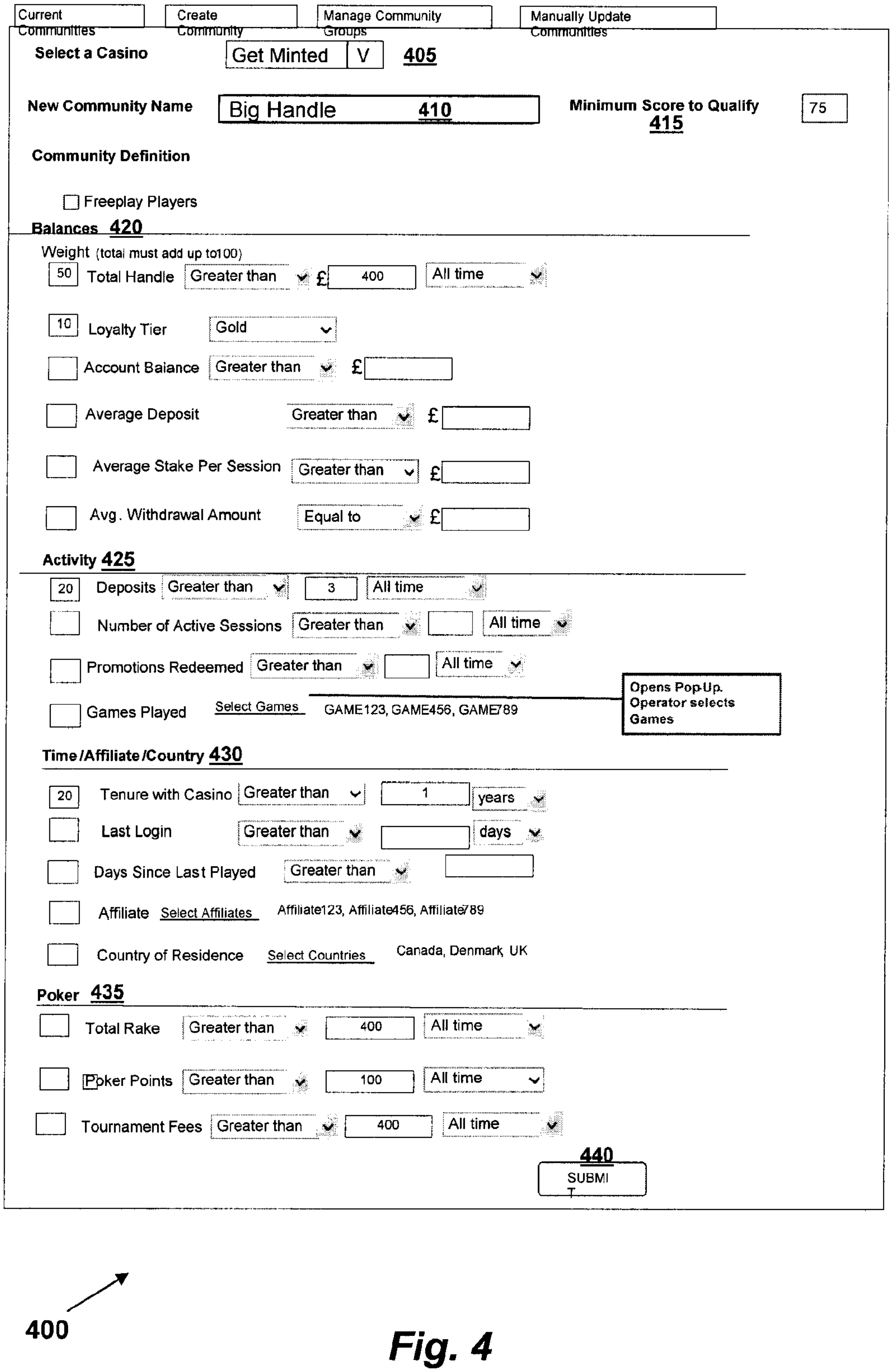
FIG. 4 is an example of a graphical user interface that may be used to implement related methods of the invention.
Figure 5:
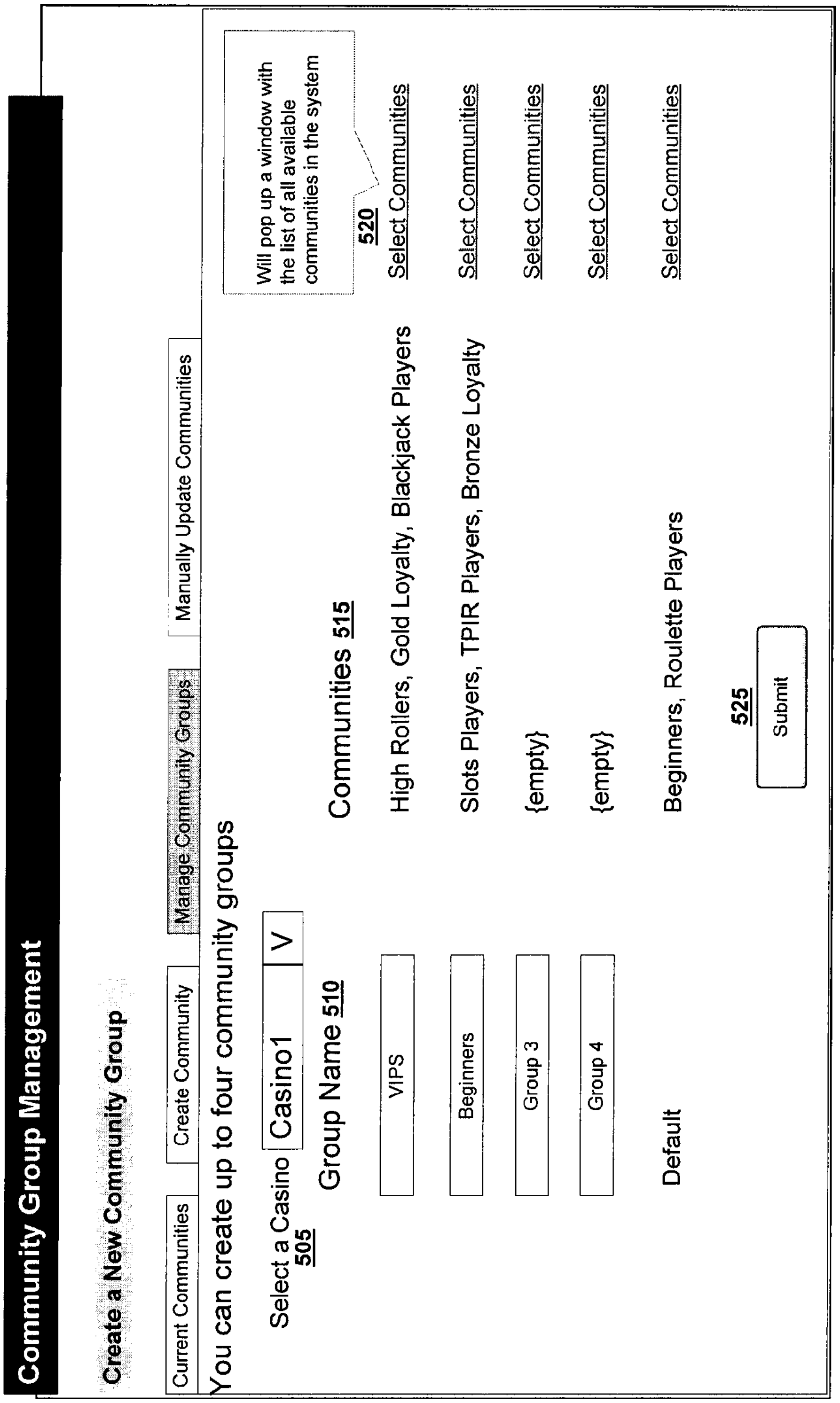
FIG. 5 is another example of a graphical user interface that may be used to implement some methods of the invention.

Methods for creating and modifying player communities are described in more detail elsewhere herein, e.g., with reference to the flow chart of FIG. 2. Some examples of graphical user interfaces ("GUIs") that may be used for managing player communities are illustrated in FIGS. 3, 4 and 5.

After the player's community has been determined, wagering games associated with the player community are determined, e.g., via reference to a database of a central system. (Step 120.) Wagering game characteristics, such as denomination, volatility, etc., may also be determined according to the player community. Other aspects of game and content presentation associated with the player community may also be determined.

As known by those of skill in the art, a pay table is the name for a list of game outcomes and associated payouts for a slot game, a video poker game, etc. The pay table for a slot game, for example, indicates how many credits the bettor will win for each combination of symbols and number of credits bet. The pay table for a video poker game indicates how many credits the bettor will win for each general type of poker hand, e.g., a full house, a flush, two pair, three of a kind, etc. The probability corresponding to each general game outcome is sometimes referred to as a "payback percentage," the sum of which is sometimes referred to as a "paytable percentage."

In a typical slot game, the paytable changes based on the number of paylines played. A player playing one payline expects all wins to be a multiple of his or her wager. Increasing the number of paylines played increases the "hit frequency" or frequency of winning some amount. However, increasing the number of paylines played also reduces the average payout size. Accordingly, players who play larger numbers of paylines can play longer but are less likely to have substantial payouts when they do win.

For example, a player playing 10 paylines expects some wins that are less than his or her wager (sometimes referred to as "dribble pays" or "cherry dribblers"), but that allow the player to continue playing longer than if only 1 payline were being played. Playing a large number of paylines appeals to players who desire a smooth, low-volatility game that they can play for a relatively long time. On the other hand, playing a small number of paylines appeals to players who prefer a higher-volatility game with less frequent but larger payouts. Differences in hit frequency, volatility and/or paytable percentage will sometimes be referred to herein as "pay models" or the like.

A determined wagering game presentation is then provided to the player. (Step 125.) Step 125 may vary according to various factors, including the characteristics of the player community, the type and location of the device used for gaming and the provisioning mode. For example, for online implementations, a player may be presented with a web page having wagering game options, a characteristic layout, colors, graphics, etc., corresponding to the player community. Featured games, which may be displayed prominently on the web page, may be quite different from one community to another. If the same wagering game themes are presented to more than one community, wagering game characteristics (such as denomination, volatility, etc.) may be different.

For in-casino server-based implementations, wagering games having wager gaming attributes consistent with the player community may be downloaded to an electronic gaming machine of the casino. The type(s) of wagering games, specific game themes, volatilities, denomination, etc., may be determined by the player community.

In some such examples, the wagering games and/or characteristics provided may be based, at least in part, on information in the casino's player loyalty account. For example, predetermined games, paytable percentages, volatilities, etc., may be determined according to a player's preferences, game play history and/or rank in a player loyalty program. In some implementations, a "high roller" (e.g., as determined by a player's rank in a player loyalty program and/or other indicia of high wagers, frequent wager gaming, etc.) may receive predetermined advantages, e.g., better paytable percentages. For example, a "high roller slots" player community may be defined, having members who all enjoy certain types of slot games and who all have predetermined indicia of a "high roller" status. In some such implementations, all of the players in this community would be provided the benefit of better paytable percentages than those for players in a "beginner slots" player community.

The wager gaming and/or content presentation may vary according to attributes of the device used for wager gaming. The wager gaming device may be a stationary device, such as a desktop computer or a stationary EGM, or may be a mobile gaming device. Some implementations may involve different presentations for stationary and mobile gaming devices.

According to some such implementations, the presentation may depend on device location. For example, wagering games and/or wagering game attributes may be provided according to the legal requirements of a device's jurisdiction. Wagering limits, wagering game time limits, may be imposed according to jurisdictional requirements.

Even within the same legal jurisdiction, the presentation may depend on device location. For example, a mobile device could be configured for X-rated slots if a player is playing in an "adults only" area of a casino (e.g., at a bar), but not if the player is in a family-oriented area of the casino (e.g., at the pool). There could be other designated areas of a casino wherein particular games and/or presentations would or would not be allowed. Accordingly, the location of a mobile gaming device may need to be determined on an ongoing basis.

The presentation may also depend on other device attributes. For example, some wager gaming machines provided by the present assignee feature a "service window" for presenting non-gaming content, GUIs for player services, etc. Relevant information is described in U.S. patent application Ser. No. 11/595,774, entitled "Method And Apparatus for Integrating Remotely-Hosted and Locally Rendered Content on a Gaming Device" and filed on Nov. 10, 2006, which is incorporated herein by reference and for all purposes. In some implementations involving a service window, the service window may be unique for a particular player community (or at least have features characteristic of that community). If a portable gaming device with a relatively small display is used for wager gaming, at least a predetermined portion of the display may be dedicated to wagering game display as opposed to, e.g., offers, promotions and other non-gaming content provided in a service window.

In step 130, a player's wagering game selections and credit are received. Selected wagering games are provided (step 135) until there is an indication that play will not be continued, as determined in step 140. This determination may be based on various factors, including an online player's selection of a "log off" or similar option, a lack of player activity for a predetermined period of time, a credit balance of zero, etc. Preferably, one or more data structures (step 145) are updated to record aspects of the gaming session before the process ends (step 150). In some preferred implementations, some data structures are updated (step 145) on an ongoing basis during other parts of the process 100, e.g., to preserve state information, associated wager gaming information, etc. In step 150, process 100 ends.

FIG. 2 outlines the broad contours of some methods of creating and/or modifying a player community. The steps of method 200 may be performed, for example, by software executed by one or more devices of a casino's computer system, e.g., host devices, servers, etc. (Examples of some such devices and networks are described below.) Such software may be provided to a casino administrator. In step 201, an administrator logs into the system. After a successful login process, the administrator may be presented with an administrative "home" screen or the like, providing tools for various types of administrative functions. (Step 203.)

Some functions that are important to the present invention involve community management. If the administrator indicates a desire to perform some type of community management function (as determined in step 205), e.g., by selecting a tab or other area of a GUI, the administrator is presented with a community management screen in this example. (Step 210.) If the user does not indicate a desire to perform a community management function, it will be determined in step 245 whether the user wishes to perform other tasks. If so, one or more GUIs appropriate for performing the indicated tasks will be provided (step 250), until these tasks are complete.

However, in this example the administrator wants to perform some type of community management function. FIGS. 3-5 depict some examples of community management GUIs that may be provided according to some aspects of the present invention. GUI 300 of FIG. 3, for example, may be presented in step 210.

GUI 300 is a "Current Communities" GUI, as indicated by active tab 305. In this example, selecting "Create Community" tab 310 would cause GUI 400 of FIG. 4 to be displayed. Similarly, selecting "Manage Community Groups" tab 315 would cause GUI 500 of FIG. 5 to be displayed. These figures will be discussed below. A user may also select tab 320 if he or she wishes to manually update a community.

Field 325 allows a user to indicate a casino with which the displayed communities are associated, which in this example is "Casino1." The check boxes of "Select" field 330 allow a user to select one or more of the communities listed in Community Name field 335 for a desired action. For example, a user may remove selected communities using control 385. The communities indicated in Community Name field 335 have already been created, e.g., via a process that will be discussed below with reference to FIG. 4.

Casino field 340 indicates that all of the displayed communities are associated with Casino1. In this example, all of the communities are members of a community group, as indicated in Community Group field 345. However, it is not necessarily the case that each community will be part of a community group.

Community Priority field 350 helps to determine which community a player will enter if the player qualifies for more than one community. For example, if a player qualifies for two or more communities, the player may be placed into the community with the highest priority. The user may update priorities of selected communities using control 390.

Community ID field 355 indicates the community identification number for each community. This community identification number is preferably assigned when a community is created and may be used internally, e.g., during a community upload process to determine the community to which players should be assigned.

Number of Members field 360 indicates the number of members currently in a community. In this example, the number is displayed as a hyperlink which, if activated, takes the user to a listing of the individual players.

Migrate Community control 365 allows a user to move members of a community (in this example, all of the members of a community) to another community. Preferably, a community can only be migrated to another community of the same casino. Selected communities may be migrated to another community group using control 395.

Creation Date field 370 indicates the date and time that a community was created. In some implementations, the date and time are used as a primary sort field, with the oldest communities listed at the top of the list. Created By field 380 indicates the person who created a community. Last Updated field 375 indicates the date and time that the community was last updated, e.g., when members were added or removed.

Returning now to FIG. 2, it is determined in step 215 whether the administrator has indicated a desire to create or modify a player community. For example, it may be determined in step 215 that the administrator has selected "Create Community" tab 310. If so, one or more GUIs will be displayed to provide tools for creating or modifying a player community.

One such GUI may allow a user to indicate a community name and characteristics. (Step 220.) The characteristics preferably include characteristics of players who may be in the community, e.g., according to experience level, wagering history, preferred wagering game and/or game theme types, etc.

A player's risk wagering preferences and/or risk tolerance may also be used as criteria for defining wagering game characteristics of a player community. Indications of such factors may be determined directly or indirectly. In one example of a direct approach, a player may have been asked to complete a wagering preferences profile that includes questions regarding typical wagering amounts, volatility preference, etc. This information could be stored, then referenced when creating a player community. Alternatively, such data may have been acquired during a player's prior gaming sessions and stored. In such cases, a player may not need to voluntarily provide such information by completing a profile.

In some implementations, relevant information may be based, at least in part, on inferences. For example, regarding an experienced player who has a history of playing slots at high stakes, it may already have been established that that the player is familiar with slot games and could be included in an "experienced slot players" community. Moreover, at least two potential inferences may be made: (1) that the player is interested in relatively higher-denomination games; and possibly (2) that the player may want the types of pay models that offer a relatively lower hit frequency/higher volatility combination. Wagering game characteristics of a player community may be defined accordingly. If such a community already exists, the player may be assigned to the community.

One or more GUIs may be presented for an operator to indicate relevant wagering game types and wagering game attributes/characteristics. (Step 225.) Accordingly, an operator may define a community to promote certain games with those attributes. (Step 230.)

In one implementation, when a user selects Create Community tab 310 of FIG. 3, GUI 400 of FIG. 4 would be displayed. GUI 400 includes field 405 for indicating an associated casino and field 410 for indicating a new community name. In this example, different criteria can be assigned different weights. A player may be included in the community if the player has a minimum qualifying score, as indicated in field 415. In this example, the score does not have units and the weighting values must be selected to total 100. Other implementations may use different weighting criteria, different totals, etc.

Here, the relevant criteria include Balance criteria 420, Activity criteria 425, Time/Affiliate/Country criteria 430 and, if applicable, Poker criteria 435. Other implementations may use more criteria, fewer criteria and/or other criteria.

In this example, the selected Balance criteria 420 include total wagers or “handle,” loyalty tier, account balance, average deposit, average stake per session and average withdrawal amount. Here, all of the monetary criteria are indicated in pounds sterling, though any convenient denomination may be used. Total handle is given the greatest weight, 50, in defining this particular player community. Loyalty tier is given a weighting of 10.

Here, the only Activity criterion that has been assigned a weight is “Deposits,” with a weighting of 20. A user could alternatively select number of active sessions, promotions redeemed and/or wagering games played, wherein the user may select the wagering games. Here, the wagering games may be selected from a dropdown list, e.g., of all games made available by the casino. In some implementations, an administrator may also be able to select wagering game characteristics, such as denomination, volatility, etc.

In this example, the user has assigned a weight of 20 for players who have been registered with the casino for more than one year. The user has assigned no weight to the last login, days since last played, affiliate or country of residence criteria. In some implementations, “affiliates” may include gaming establishments, entertainment venues, restaurants, retailers and/or other entities.

Here, an administrator may select poker criteria 435, if desired or appropriate. In this example, poker criteria 435 include only total rake, poker points and tournament fees. However, in alternative implementations, other poker criteria may be used, such as poker game preferences.

When the user has defined a community, the user may activate “Submit” button 440 to save the selected criteria, weights, etc. Other player communities may be created, if a user so desires.

In step 235 (see FIG. 2), it is determined whether a user wants to create or modify a group of player communities. If so (e.g., if a user activates Manage Community Groups tab 315 of GUI 300 or GUI 400), one or more GUIs will be provided that are appropriate for community group management. (Step 240.)

Community groups may be formed for various reasons, such as assigning common features to more than one community. For example, a community group may be formed as a simple way to implement and manage similar site content, e.g. promotional text, images, etc., of the various communities in a group.

In some implementations, there may be large numbers of communities. In online implementations, for example, if each of a large number of communities has its own unique site presentation and content, these features may be challenging to manage. For example, it may be challenging to manage future releases of the underlying software. Casino operators may need to engage a significant number of copy editors, graphic artists, etc. Using the same or similar features in all communities in a group can simplify these processes and reduce costs.

In some implementations of the invention, there may be a finite number N of unique “site content” possibilities. For example, a casino operator may be able to present unique content up to N different ways. A community group may be associated with each general type of unique content. An operator may assign a general type of unique content to a community by using a community group feature.

FIG. 5 illustrates one such example. A user may specify the relevant casino in field 505. Group name fields 510 allow a user to create up to 4 community groups in this example. However, other implementations may allow a user to create more or fewer community groups. The communities in each group are indicated in Communities fields 515.

Here, new communities may be selected using “Select Communities” controls 520, which will open a window that indicates a list of available player communities. Preferably, each community associated with the casino in field 505 will be listed, including any that had recently been created as described above (e.g., the new “Big Handle” community). When the user has finished his or her desired community group management tasks, the user may activate “Submit” button 525 to save the results.

If the administrator desires to perform other administrative tasks (as determined in step 245 of FIG. 2), additional GUIs may be provided for these tasks. (Step 250.) When the administrator’s tasks are complete, all results will be saved in the appropriate database(s) and/or storage device(s). (Step 255.)

Figure 6:
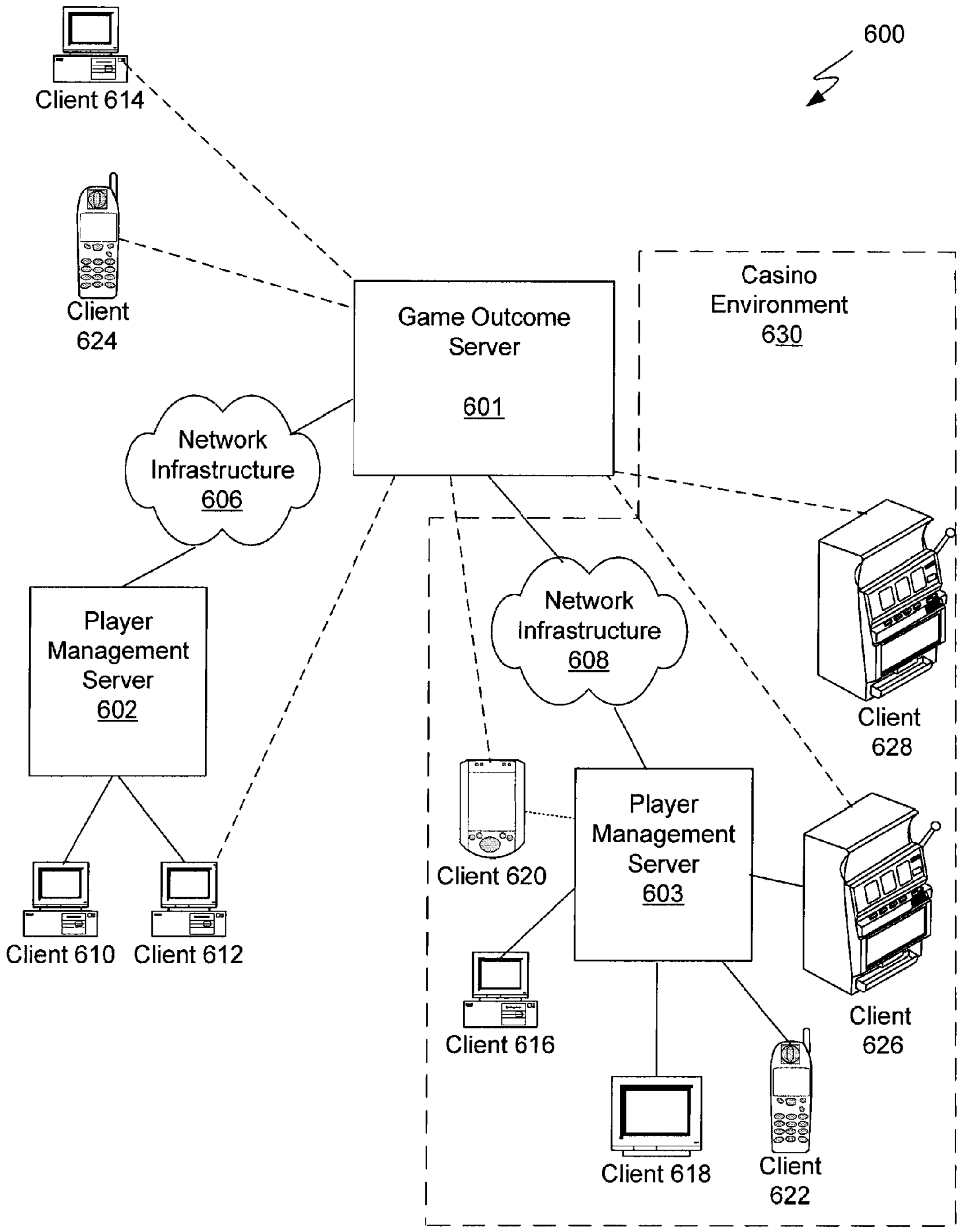
FIG. 6 illustrates an example of a gaming system that may be used in some embodiments of the invention.

FIG. 6 illustrates a block diagram of a gaming system 600, which will be used to describe some embodiments of the present invention. The gaming system 600 may provide wager-based gaming services on a number of different clients. The gaming system 600 may comprise a game outcome server 601, player management servers 602 and 603, network infrastructure, such as 606 and 608, and clients 610, 612, 614, 616, 618, 620, 622, 624, 626 and 628.

The clients in the gaming system 600 provide an interface that allows a user to participate in a game. The game may be a game of chance or a game of skill and may include wagering on an outcome of the game. To provide the interface, the client may at least include a display device for viewing the game and input mechanism for making choices related to the play of a game. For example, the input mechanism may allow a player to select a wager amount, initiate a game, select paylines, hold/draw cards, select a game, etc. Some examples of input mechanisms include but are not limited to a mouse, keyboard, buttons on a button panel and a touch screen.

Many different types of clients may be used in the gaming system 602. Some examples of clients include but are not limited to personal computers, 610, 612 and 614, cell phones 622 and 624, a tablet computer 618, a PDA 620, casino-type gaming machines 626 and 628 and a television set-top box 616. During game play, the clients may be located in a monitored and relatively secure environment, such as a casino environment 630, or in an unmonitored environment, such as a user’s home. The casino environment 630 may include locations associated with a casino where game play is allowed. Nevertheless, the clients of the present invention may be used in other environments, such as stores, restaurants, bars, racetracks, sports books and other venues where game play is allowed.

The network infrastructure, such as but not limited to 606 and 608, that allow the clients and servers to communicate with one another may comprise various combinations of wireless and wired communication links. Also, various wireless and wired communication protocols may be employed over these links as is appropriate for the devices that are communicating and the type of communication link that is being utilized for the communication. The protocols that are utilized may be of a proprietary or non-proprietary nature. The network infrastructures 606 and 608 may utilize communication links provided by wide-area networks, such as the Internet, a wide area progressive jackpot network, a Wi-Fi network or a cell phone network and/or local area networks, such as a communication schema provided within a casino.

In one embodiment, the player management servers 602 and 603 may allow a remote client to provide game play of games where a monetary balance is adjusted based upon the outcome of the game. To enable the game play, the player management servers, 602 and 603, may be operable to provide an account with a balance of funds that a player may use to play games. As part of the account management, the player management servers may be operable to allow funds to be deposited and transferred from the account. In a particular embodiment, the transfers of funds into and out of the account may be performed electronically. The electronic fund transfers may involve credit cards, debit cards, bank accounts, wire transfers, etc. Other types of fund transfers, such as via paper check, may also be employed. The player management servers, 602 and 603, may manage accounts for thousands or tens of thousands of players and may be capable of providing game play for thousands of players simultaneously.

When a player doesn't have an existing account with the player management servers, such as 602 or 603, then the player management server may be operable to establish a new account with the player. The registration process may include functions, such as but not limited to determining that a player is eligible to play by checking their location, age, financial institution, credit, details about the device being used, etc. Once a player's eligibility to play is verified, an account for the player may be set-up. The account set-up may include but is not limited to player information, device information, financial information and a verification mechanism, such as a password, player biometric details, PIN number, hardware details or combinations thereof. After funds have been established in the account, a game play session utilizing the funds in the account may be initialized. In some embodiments, the player management servers, 602 and 603, may carry out a verification process each time a player tries to access their account. Details of a verification process that may be used with the present invention are described in co-pending U.S. application Ser. No. 11/039,065, filed on Jan. 18, 2005, by Mathews, et al., and titled, "Configurable and Stand-alone Verification Module," which is incorporated by reference herein in its entirety and for all purposes.

After a player accesses their account on one of the player management servers, such as 602 and 603, via a client device, game play may begin. In one embodiment, the player management servers, 602 and 603, may host a web-site that provides a portal that allows the player e to access their account and to play games. During game play, the player management servers, 602 and 603, may maintain and update a player's balance in their account as a result of their gaming activities. Gaming activities may include but are not limited to sports wagering or wagering on other types of events, playing games of chance, such as slot games, card games (e.g., poker and blackjack), roulette games, bingo games, lottery games, keno games, or dice games, and playing games of skill, such as solitaire. Further details of providing gaming services that may be used in the present invention are described in co-pending U.S. Patent Application Publication Nos. 2004/0242322, titled "Flexible User Interface," filed Dec. 15, 2003 by Montagna, et al., 2004/0152511, titled "Cross-Enterprise Gaming Server," filed Sep. 23, 2003, by Nicely, et al., and 2005/0176500, titled, "Configurable and Stand-Alone Verification Module," filed Jan. 18, 2005, by Mathews, et al., each of which is incorporated herein by reference in its entirety and for all purposes.

The player management servers, 602 and 603, may be operable to allow a number of gaming activities to occur simultaneously that may affect a player's balance tracked by the player management server. For instance, a player may be playing two or more games of chance simultaneously via an interface on a client device. In another example, a player may be making sports wagers that decrease a player's balance or receiving the results of sports wagers that may increase a player's balance while playing a game of chance or other type of game that may increase or decrease their balance depending on the outcome to the game via an interface on a client device.

Traditionally, Internet casinos have used a centralized, integrated software architecture to provide gaming activities, such as a casino software platform that may include a combination of player account management, player registration, player tracking, money handling, player verification, client software management and game services (e.g., generating game outcome and associated presentations and storing a record of game play dispute resolution purposes). Different software providers provide different casino software platforms where each software provider may use different software implementations to generate the functions described above. Associated with each casino software platform is a unique set of games that are only compatible with casino software platform provided by the software provider of the casino software platform.

As an example of utilizing casino software platforms, provided for illustrative purposes only, player management server 602 may be installed with a first casino software platform from a first casino software provider that provides a first set of games and player management server 603 may be installed with a second casino software platform from a second casino software provider that provides a second set of games. In one embodiment, player management server 602 may be a first Internet Casino and player management server 603 may be a second Internet Casino. In operation, each of the player management servers, 602 and 603, utilizing the integrated casino software platforms may have unique customer database, unique player management functions/capabilities and a unique set of games associated with each integrated casino software platform. An advantage of an integrated casino software platform is that an operator may install one of the packages on a server and have an online casino up and running.

As noted previous paragraph, each integrated casino software platform is associated with a unique set of games. The provider of the integrated casino software platform may update the games that are available for their platform. However, a game developed for a first casino software platform by a first software provider is generally not compatible with a second casino software platform. Thus, if an operator desires access to a popular game from a first casino software platform provider and already is set-up with a casino software platform from a second casino software platform provider, then, to obtain access to the popular game, the operator is limited to either 1) setting up a new server with the first casino software platform that provides the popular game or 2) forgoing the popular game, and utilizing only the games provided by the second casino platform software provider. In the case, where the operator decides to set up the new server with the first casino software platform including the popular game, the operator has to worry about maintaining two different casino software platform packages, porting account information to the new casino software platform and compatibility issues between the two casino software platforms.

One solution to the problem described in the previous paragraph, as identified herein, is to provide method and apparatus for game services that are compatible with multiple casino software platforms. The method and apparatus may include a game outcome server, such as 601, that provides game services that are compatible with different integrated casino software platforms. For example, in one embodiment of the present invention, player management server 602 may utilize, a first casino software platform and player management server 603 may utilize, a second casino software platform. Again, a unique set of games may be native to each platform. Player management server 602 may provide a remotely accessible interface, such as a but not limited to web-site, that provides first content, such as text or images, related to the games native to the first casino software platform and second content, such as text or images, related to the games provided by game outcome server 601. Similarly, player management server 603 may provide a remotely accessible interface, such as but not limited to a web-site, that provides third content, such as text or images, related to the games native to the second casino software platform and fourth content, such as text or images, related to the games provided by game outcome server 601.

In a particular embodiment, the first content, second content, third content and fourth content, may each include selectable links, such that when the player management server 602 or 603 receives information from a client that one of the links is selected, a process for providing a play of a selected game corresponding to one of the links is initiated. The method of providing the play of the selected game may differ depending on whether the selected game is native to the casino software platform of player management server 602, the selected game is native to the casino software platform of player management 603 or the selected game is provided by game outcome server 601 as will be described as follows in regards to various embodiments of the present invention.

In particular embodiments, when player management server 602 receives information indicating that a link that is associated with a game generated by the game outcome server is selected, then an interaction between the player management server 602, the game outcome server and a first client device may be initiated (The first client device and the player management server 602 have already initiated a communication session at this point and a verification process may have already occurred involving the first client device and the player management server 602). The selected link may be represented by the second content, described in the above paragraphs, generated on the remotely accessible interface provided by the player management server 602. Similarly, when the player management server 603 receives information indicating that a link that associated with a game generated by the game outcome server 601 is selected, then an interaction between the player management server 603, the game outcome server 601 and a second client device may be initiated. The selected link may be represented by the fourth content, described in the above paragraphs, generated on the remotely accessible interface provided by the player management server 603. The game outcome server 601 may be operable to interact with player management server 602, player management server 603 and a number of client devices simultaneously, such as but not limited to the first client device and the second client device. Details of these interactions are described as follows.

In particular embodiments, the links to games generated by the game outcome server 601 on player management server 602 and the links to games provided by game outcome server 601 on player management server 603 may be links to the same or different games as determined via agreements between the operator of the player management server 602 and the operator of the game outcome server 601 and agreements between the operator of the player management server 603 and the game outcome server 601.

A game generated by the game outcome server 601 may be customized in some manner for a particular player management server, such as 602 or 603. Thus, the player management servers, 602 and 603, may each provide a link to a similar game on the game outcome server 601 that differs by the customization generated for each player management server 602 and 603. In a particular embodiment, the customization may be as simple as incorporating a name or a logo associated with each of the player management servers, 602 and 603, to differentiate game. In general, when a communication session is initiated between a player management server, such as 602 and 603, the game outcome server 601 may be operable to receive information, such as but not limited to text or a logo, from the player management server that allows the game outcome server to customize games provided to clients of the player management server. The customization information may be incorporated into the game outcome presentation associated with a particular game.

The games identified by the links may be varied in time and/or customized according to the player. In one embodiment, the player management servers, 602 and 603, may be operable to vary the links according to some defined criterion or criteria, such as according to a time of day, in response to a player's game playing history or in response to some other information known about the player. In another embodiment, the player management servers, such as 602 and 603, may be operable to allow the game outcome server 601 to control or affect content presented on a portion of the remote interface for a client that the player management servers, 602 and 603, each generate that includes the links to the games on the game outcome server 601. Thus, the game outcome server 601 may include logic that allows the links to games provided on the remote interfaces of the player management servers, 602 and 603 to be modified by the game outcome server 601.

When the game outcome server 601 is allowed to affect the content related to the game links to itself on a player management server, 602 and 603, the method and criteria the game outcome server 601 uses to select the game links to present on the player management server, such as 602 and 603, may depend on how much information the player management server shares with the game outcome server 601. In some embodiments, the player management server, such as 602 and 603, may share information about the player and the game outcome server 601 may utilize the shared player information to select game links. The shared player information may be general enough so that the player remains anonymous, such as a player's age, sex, birthday, city where they live, playing preferences, such as games they have played before, etc. In other embodiments, the player management servers may not share any player information with the game outcome server and the game outcome server may be operable to select game links and affect the content presented on the remote interface without using player information. For instance, the game outcome server may use calendar information, such as time of day, time of year, season, holiday information, etc., to select game links to present on the interface provided by the player management server, such as 602 or 603.

In a particular embodiment, the player management servers, 602 and 603, don't have to provide any native or locally generated games associated with a casino software platform. The player management servers may only perform player management functions, such as account management or player verification. The game services may be provided via links to one or more games provided by one or more game outcome servers, such as game outcome server 601. Further, in one embodiment, the game outcome server 601 may only provide games and not any player management functions. In another embodiment, the game outcome server 601 may provide player management functions and game services for a first group of game players and only game services for a second group of game players where the player management functions are provided by another device, such as the player management servers, 602 and 603. In yet another embodiment, the game outcome server 601 may provide a portion of the player management functions, such as player verification, and game services while the rest of the player management functions are handled by another device, such as the player management servers, 602 and 603.

In one embodiment, the game outcome server 601 may be operable to provide games where a player's balance is maintained on a device remote from the game outcome server 601. The player's balance may be used in association with the games generated on the game outcome server 601, such as to make wagers on an outcome of a game. Thus, methods and apparatus may be utilized that allows the remote device and the game outcome to confirm that the player has an adequate balance to perform a desired action via the game outcome server, such as make a wager. In addition, information generated on the game outcome server 601 may affect the player's balance maintained on the remote device. Thus, method and apparatus may be utilized that allow the balance on the remote device to be updated in response to event generated on the game outcome server 601, such as an award amount corresponding to a game outcome generated on the game outcome server 601.

In some instances, games played on the game outcome server may not affect a player's balance and a balance on a remote device may not have to be updated. For example, the game outcome server may provide the play of games for free with simulated wagers. In which case, the game outcome server may provide the play of a game but the player's balance is not affected.

When the game outcome server doesn't maintain a player's balance, the remote device that maintains a player's balance may be a player management server, such as 602 and 603, or a slot machine, such as 626 and 628. In general, any device or system that is operable to maintain a player's balance, may be utilized with a game outcome server in this embodiment. Further, details of method and apparatus that may be utilized with this embodiment are described with respect to FIGS. 2-6.

Returning to FIG. 6, on the client interface, which may vary from device to device, in one embodiment, in at least a first portion of a display associated with the client interface, one or more game links that lead to game outcome server 601 may be provided when the client device is in communication with one of the player management servers, 602 and 603. After one of the player management servers, 602 and 603, receives information indicating one of the game links has been selected that corresponds to a game provided the game outcome server 601, the player management server may send information to the game outcome server 601 that allows the game outcome server 601 to establish a communication link with the client device. When the selected game link is for a game that is provided natively on the player management server, such as 602 or 603, then there is no need to establish a communication link between the game outcome server 601 and the client device.

In various embodiments, the information sent form the player management 602 server to the game outcome server that allows the game outcome server 601 to establish a communication link with the client device may include but is not limited to one or more of the following: a game identifier, an identifier associated with the message sender, a unique player identifier such as a number or a name, the player's stated country of residence, other player registration information such as language, player balance, player currency, and other information concerning the player's account used in customizing the game provided by the game outcome server 601 or combinations thereof. The player management server 602 may also send security credentials to the game outcome server 601 to authenticate that request as being from an authorized system. The game outcome server 601 may store information regarding authorized systems from which it may receive a player referral and balance information, such that its security credentials may be verified.

After the communication link with the client device is established, the game outcome server 601 may provide information to the client device that alters the client interface in some manner. For example, in one embodiment, a window may pop-up, on the client interface that provides a portal to the game outcome server 601. Next, the game outcome server 601 may be operable to provide a gaming application to a client, via a download if necessary, that allows a wager-based game to be played on the client. In some instances, a download may not be necessary because the gaming application may already reside on the client. As part of the communication between the client and the game outcome server 601, the game outcome server may request information from the client to determine whether the gaming application is already resident on the client.

In particular embodiments, the gaming application may be configured to allow the client to establish a gaming session where a game is played on the client. During the gaming session, the gaming application may send information regarding inputs made on the client and in response receive commands, instructions, data or combinations thereof, from the game outcome server 601 that allow the game outcome server to affect a presentation of the game on the client. The presentation may correspond to the game outcome generated on the game outcome server 601 in response to a wager, such as the game outcome to a slot game (final position of slot reels) and any awards associated with the game outcome. In one embodiment, the game outcome server 601 may not maintain a player's balance information. Thus, prior to presenting the game outcome on the client, the game outcome server 601 may need approval from a device that may maintain a player's balance, such from a player management server, such as 602 and 603 or from a slot machine or other money-handling capable device, that the player's wager is valid, i.e., the player has sufficient funds for the requested gaming activity provided by the game outcome server 601.

In another embodiment, as is described in more detail with respect to FIG. 4B, a client via the game outcome server 601 may be operable to request a transfer of funds from a player management server 602 to the game outcome server 601 or a client via the player management server 602 may be operable to a request a transfer of funds from the player management server 602 to the game outcome server 601. After the funds are transferred to the game outcome server 601, via the client, a player may play a series of games on the game outcome server 601 with the transferred funds. Using the transferred funds, the game outcome server 601 may not need to get approval from the player management server 602 each time a game is played as long as a current balance of the transferred funds is sufficient to cover a player's requested gaming activity.

In the embodiment described above, the game outcome server 601 may maintain a temporary balance of the transferred funds. As a result of gaming activities generated on the game outcome server 601, a balance of the transferred funds may be increased or decreased depending on an award associated with each gaming activity. The game outcome server 601, in response to a) a request received from the client device, b) a request received from the player management server or c) an event initiated on the game outcome server, such as after a time period expiring, may be operable to transfer any remaining funds in the temporary balance back to the player management server 601. In addition, when the funds remaining a temporary balance are exhausted, the player management server 602 and/or the game outcome server 601 may be operable to initiated a transfer of funds from the player management server 602 to the game outcome server 601 that allows the temporary balance maintained on the game outcome server to be supplemented to allow for additional gaming activities provided by the game outcome server 601.

The gaming application may be based-upon proprietary custom software, may be based on a non-proprietary software environment, such as an Adobe Flash,™ or combinations thereof. For instance, in one embodiment, the game outcome server 601 may be operable to download a Flash-based gaming application comprising a plurality of Flash-based movies that allows a wager-based game to be played on any of the types of clients in FIG. 6. The client may include a media player that is compatible with the Flash based movies. In particular embodiments, the contents of the Flash-based gaming application may be tailored by the game outcome server 601 according to the hardware capabilities of the client device receiving the application. Thus, a home computer, such as 610, may receive a different application then a cell phone, such as 622.

In another embodiment, the game outcome server 601 may be operable to stream a game outcome presentation to any of the types of clients in FIG. 6. In video streaming, the video frames of a game outcome presentation may be generated on the game outcome server 601 and then transmitted for display on the client. The game outcome server 601 may be operable to adjust the frames, such as size, resolution, frame rate, etc., to account for the display capabilities of the client receiving the video frames.

The multimedia player and associated files, such as the Flash Player™ may be a component of a "Rich Internet Application," (RIA). Rich Internet applications (RIA) are typically interface applications provided by a host to a client with downloadable components that have the features and the functionality of locally installed and executed programs. RIAs typically transfer the processing necessary for the interface generated by the application to the client but keep the bulk of the data (i.e., maintaining the state of the program, the data etc) back on the host. RIA's are not limited to web-based applications applied over the Internet and may be utilized in other network architectures. In an RIA involving a host device and a client device (e.g., the game outcome server 601 may be considered a "host" and gaming devices, 610, 612, 614 and 624 may be considered a "clients" in particular embodiments), an application for generating an interface executed on the client may be operable to perform functions independently of the host, such as computations, send and retrieve data in the background, store data locally, redraw sections of the screen, and/or use audio and video in an integrated manner, etc.

In particular embodiments, the game outcome server 601 may download a gaming application to the casino-type gaming machine 628 where the gaming application is executed on the gaming machine. In another example, the game outcome server may be operable to stream video for a game of chance to the personal computer 612 where the video is displayed on client 612. In yet another example, the client 620 may be a portable wireless game device that is operable to receive gaming services from the game outcome server 601. In a casino environment 630, the portable wireless gaming device may be utilized in certain restricted areas associated with a casino, such as around a pool.

In general, the clients may be operable to execute gaming applications, such as Flash-based games, games configured for other compatible media player or customized gaming application software, and/or receive video streams that are displayed on the client. Further, the clients may be operable to provide game play of multiple games at the same time. For instance, a client may be operable to communicate with multiple game outcome servers at the same time and provide game play for different games available on each of the game outcome servers at the same time.

In another embodiment, the client may be operable to provide a game play of multiple games at the same time via a single game outcome sever 601. For instance, the client may be simultaneously connected to the game outcome sever 601 via two separate gaming sessions on each of player management servers, 602 and 603. As another example, in a single gaming session, such as initiated through one of the player management servers, the game outcome server 601, may allow the client to open up multiple windows where the same game or different games may be played in each window.

As previously noted, the game outcome server 601 may connect to and provide gaming services to multiple clients simultaneously. The clients may be associated with different player management servers, such as 602 and 603. For instance, the game outcome server 601 may be in communication with clients 614, 624 and 620 simultaneously allowing a slot game to be played on client 614, a card game to be played on client 624 and a bingo or keno game to be played on client 620. As noted above, each of these clients, 614, 624 and 620, may be operated in different locations by different users, wherein the devices may be connected to the player management servers, such as 602 and 603, and game outcome server, 601, using different network communications paths.

In some embodiments, the client may include native capabilities that allow a game outcome for a gaming application downloaded from the server 601 to be generated on the client. For instance, one of the stand-alone casino-type gaming machines 626 and 628 may receive a download of a gaming application from game outcome server 601, such as a Flash-based application, that generates a card game on the client and execute the gaming application. To display a game outcome and award for a play of the card game, the gaming application may utilize random number generation capabilities and money handling capabilities native on the clients 626 and 628 to generate and to display an outcome to the card game on the client. Further, in this embodiment, the balance is maintained on the gaming machine only for the player currently playing the gaming machine. Thus, some of the player management functions generally provided by a player management server may not be needed.

Details of interactions between a gaming machine and a game outcome server that may be utilized in the present invention are described in co-pending U.S. patent application Ser. No. 11/595,798, filed on Nov. 10, 2006, naming Little, et al. as inventors and titled, "REMOTE CONTENT MANAGEMENT AND RESOURCE SHARING ON A GAMING MACHINE AND METHOD OF IMPLEMENTING SAME," and U.S. patent application Ser. No. 11/595,774, filed on Nov. 10, 2006, naming LeMay, et al. as inventors, and titled, "METHOD AND APPARATUS FOR INTEGRATING REMOTELY-HOSTED AND LOCALLY RENDERED CONTENT ON A GAMING DEVICE," each of which is incorporated herein by reference and for all purposes.

During game play on the client, the game outcome server 601 may be configured to maintain a current state of the game during game play. Thus, when the game is being played on a client and a connection is lost between the server 601 and the client during game play, the client and/or the game outcome server 601 may be operable reestablish a link with the game outcome server 601 and under control of the server, the client may be restored to state in the game prior to when the connection was lost. For example, during a card game played on the client, if a connection was lost while the cards where being dealt or after the cards had been dealt but prior to the player selecting cards to hold, then the game outcome server 601, after reestablishing communications with the client, may provide information to the client that allows the same cards to be dealt again and displayed or just displayed again. The game outcome server 601 may also direct the client to display the balance and wager information that was displayed on the client prior to the connection being lost.

In one embodiment, the game outcome server 601, may have generated a tentative game outcome for the client, received an approval message from the player management server, such as 602 and 603, that the player management server, 602 or 603, that the gaming transaction is approved and then lose a connection with the client prior to the display of the game outcome. Then, the game outcome server 601 may try to reestablish communications with the client device for a specified time period. When the time period expires, the game outcome server 601 may or may not save information that allows the approved game outcome to be displayed on the client. In another embodiment, the approved game outcome may be stored on the player management server, such as 602 and 603, and when the player is able to establish communications with the player management server via the client that was utilized when the connection was lost or via another client, then the player may be able to view on the client limited information about the last game outcome recorded, such as how their balance was affected by the last game outcome.

In some embodiments, the client may have state maintenance capabilities separate from the server 601. For example, the client may store a record of game information received from the server 601 or non-critical not related to the game outcome. When the client is restored to a previous state after communications are reestablished between the server and the client, the information on the client may be used by server 601 and/or client to verify that the correct game is being restored and the client is in the proper state. For example, state information stored on secure client, such as casino-type gaming machine 626 and 628, may be compared with state information stored on the server 601 when a state of a game is restored on the client.

In one embodiment, the game outcome server 601 may generate game play on the client while an active communication session is maintained between the client and the game outcome server 601. Thus, messages may be exchanged regularly between the game outcome server 601 and the client that allows the game outcome server 601 to determine that the communication session is active. In some embodiments, when the communication session becomes inactive between the game outcome server 601 and client, an initialization process, such as a login and verification process, between the client and game outcome server 601 may have to be repeated to allow game play to continue on the client.

In another embodiment, after the player initiates a game session on a client and after they go through a successful verification process, then a gaming session initiated on the client may be valid for a time period. During the time period for which the verification is valid, a number of gaming sessions may be initiated and terminated from the client without a repeat of the verification process. In yet another embodiment, the successful verification may be valid for a number of gaming sessions on the client in a time period or just a number of gaming sessions before the verification is required to be repeated.

In other embodiments, the game outcome server 601 may provide gaming services that allow game play to continue on the client without an active communication session. For instance, for a client with random number generation and money handling capabilities, such as a slot machine, the game outcome server 601 may provide a gaming application to the client and then end communications with the client. The client may then be operable to generate game outcomes and provide input to the gaming application in a stand-alone manner.

In yet another embodiment, the game outcome server 601 may provide a gaming application and game outcomes for a plurality of games to a client. For instance, via the client, a request for 10 plays of a game with a wager amount for each game may be made to the game outcome server 601. The game outcome server 601 may generate the game outcomes for all ten games and determine a final adjustment to the player's account as a result of the ten games where each of the games may have provide a positive or a negative adjustment to the player's balance. An approval for the play of the ten games may be sent from the game outcome server 601 to one of the player management servers, such as 602 or 603. When the play of the batch of games is approved, the game outcome server may send information to the client that allows the games to be viewed in sequence or in an order determined via inputs made at the client. The gaming application and the game outcomes may allow the plurality of games to be played on the client at a pace determined by a user of the client without additional communications from the game outcome server 601. When the plurality of game outcomes are exhausted, the client may contact the game outcome server 601 and request additional game outcomes to continue game play. This capability may be valuable to a player that is paying for their connection time, such as a connection via a cell phone, because it may minimize the amount of connection time that is utilized on the client.

After a game outcome for a wager-based game is generated on the game outcome server 601, the game outcome, award information, player information, client information, wager information, time information, session information and other game related information may be stored on the game outcome server 601 as a game history record. In one embodiment, the game history record may be stored in a database in a manner that allows a player to later locate and view a record of their past game play. For a player, past game play may span game play on different clients. In another embodiment, a game operator may only have access to search game history records. At the request of a player, the game operator may retrieve the requested game history records and provide them to the player.

In a manner similar to the state information, game history records may be mirrored on the client. The game history records stored on the client may include a subset or a superset of information as compared to the game history records stored on the server 601. For example, clients, such as gaming machines 626 and 628, which are described with more detail with respect to FIGS. 5 and 6, typically store game history records of games played. Again, the duplicate records may be used for auditing and verification purposes.

To play a wager-based game on a client, jurisdictional rules, such as age limits, locations where games can be played, types of games that can be played and wagering rules that are established by a gaming jurisdiction may need to be enforced. In a "brick and mortar" gaming establishment, such as casino environment 630, the operator of the gaming devices (i.e., clients) and the manufacturers of gaming devices are typically responsible for enforcement of jurisdictional rules in the gaming jurisdiction where the gaming establishment is located and hence the location where the clients are utilized. In an Internet casino environment, the enforcement of jurisdictional rules is left up to the provider of the gaming services. These jurisdictional rules may depend on where a remote server, such as 602, 601 and 603, is located as well as a location where the client is physically located.

Further, to allow for wagering, a method for receiving cash from a player and dispensing cash to a player needs to be established. In a casino environment 630, the casino-type gaming machines, 626 and 628, are configured with money handling capabilities and cash or indicia of credits may be input and dispensed from the gaming machines. Thus, a player may use the gaming machines anonymously without having to establish an account with the casino. Although, for players with an account recognized by the casino, it may be possible to electronically transfer funds directly to the client, such as 626 and 628. For clients without money handling capabilities or for devices located in an environment that is deemed non-secure, an account may be established for a user that allows the user to maintain funds for wagering. As wager-based game is played, wins and losses from the wager-based game may be reflected in the account balance.

Further details are described with at least respect to FIGS. 2-6 of U.S. patent application Ser. No. 11/598,260, entitled "Internet Remote Game Server", all of which is hereby incorporated by reference.

Figure 7:
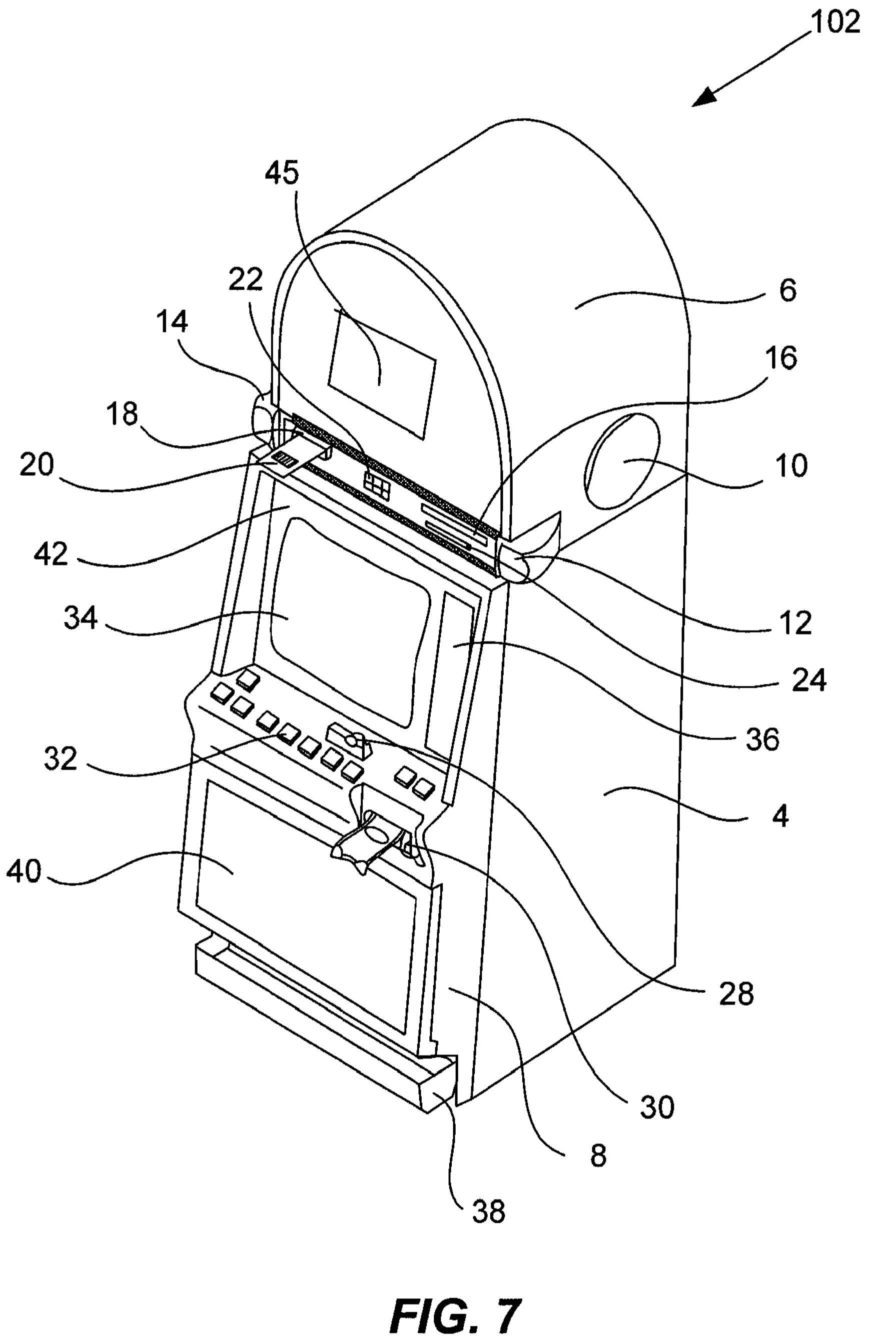
FIG. 7 illustrates a gaming machine that may be configured according to some aspects of the invention.

Turning next to FIG. 7, a video gaming machine 102 of the present invention is shown. Machine 102 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 102 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 102 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 102 may be stored as game software on a mass storage device in the gaming machine or may be generated on a remote gaming device but then displayed on the gaming machine. The gaming machine 102 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 102 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 102 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to “re-trigger” the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 7, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 102 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 102 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 8:
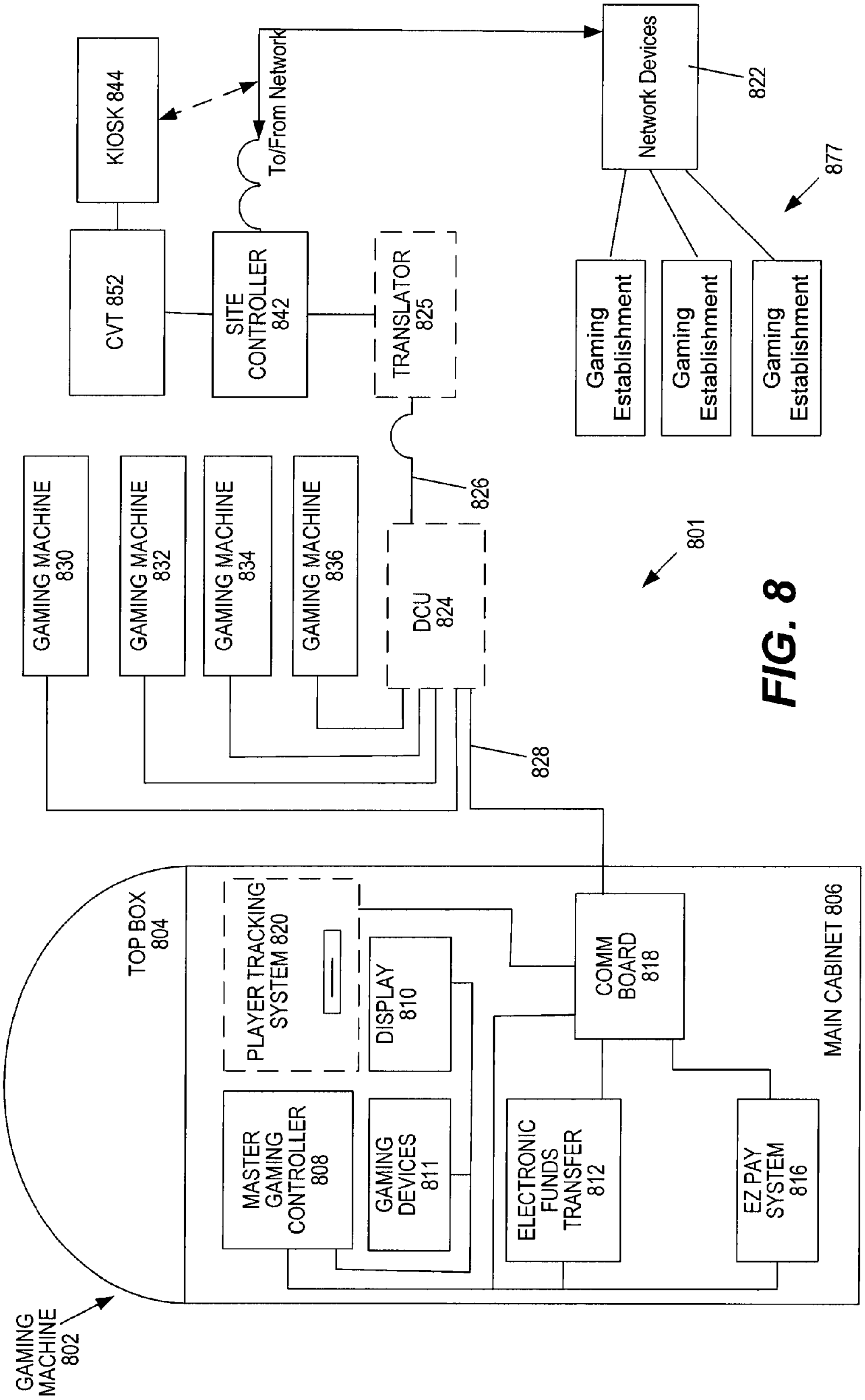
FIG. 8 illustrates a gaming machine and a gaming network that may be configured according to some aspects of the invention.

A gaming network that may be used to implement additional methods performed in accordance with embodiments of the invention is depicted in FIG. 8. Gaming establishment 801 could be any sort of gaming establishment, such as a casino, a card room, an airport, a store, etc. In this example, gaming network 877 includes more than one gaming establishment, all of which are networked to game server 822.

Here, gaming machine 802, and the other gaming machines 830, 832, 834, and 836, include a main cabinet 806 and a top box 804. The main cabinet 806 houses the main gaming elements and can also house peripheral systems, such as those that utilize dedicated gaming networks. The top box 804 may also be used to house these peripheral systems.

The master gaming controller 808 controls the game play on the gaming machine 802 according to instructions and/or game data from game server 822 or stored within gaming machine 802 and receives or sends data to various input/output devices 811 on the gaming machine 802. In one embodiment, master gaming controller 808 includes processor(s) and other apparatus of the gaming machines described elsewhere herein. The master gaming controller 808 may also communicate with a display 810.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 808 may also communicate with EFT system 812, EZPay™ system 816 (a proprietary cashless ticketing system of the present assignee), and player tracking system 820. The systems of the gaming machine 802 communicate the data onto the network 822 via a communication board 818.

It will be appreciated by those of skill in the art that embodiments of the present invention could be implemented on a network with more or fewer elements than are depicted in FIG. 8. For example, player tracking system 820 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Moreover, player tracking information may be combined with other information that is now readily obtainable by an SBG system.

Moreover, DCU 824 and translator 825 are not required for all gaming establishments 801. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 842 provides this function for gaming establishment 801. Site controller 842 is connected to a central system and/or other gaming establishments via one or more networks, which may be public or private networks. Among other things, site controller 842 communicates with game server 822 to obtain game data, such as ball drop data, bingo card data, etc.

In the present illustration, gaming machines 802, 830, 832, 834 and 836 are connected to a dedicated gaming network 822. In general, the DCU 824 functions as an intermediary between the different gaming machines on the network 822 and the site controller 842. In general, the DCU 824 receives data transmitted from the gaming machines and sends the data to the site controller 842 over a transmission path 826. In some instances, when the hardware interface used by the gaming machine is not compatible with site controller 842, a translator 825 may be used to convert serial data from the DCU 824 to a format accepted by site controller 842. The translator may provide this conversion service to a plurality of DCUs.

Further, in some dedicated gaming networks, the DCU 824 can receive data transmitted from site controller 842 for communication to the gaming machines on the gaming network. The received data may be, for example, communicated synchronously to the gaming machines on the gaming network.

Here, CVT 852 provides cashless and cashout gaming services to the gaming machines in gaming establishment 801. Broadly speaking, CVT 852 authorizes and validates cashless gaming machine instruments (also referred to herein as "tickets" or "vouchers"), including but not limited to tickets for causing a gaming machine to display a game result and cash-out tickets. Moreover, CVT 852 authorizes the exchange of a cashout ticket for cash. These processes will be described in detail below. In one example, when a player attempts to redeem a cash-out ticket for cash at cashout kiosk 844, cash out kiosk 844 reads validation data from the cashout ticket transmits the validation data to CVT 852 for validation. The tickets may be printed by gaming machines, by cashout kiosk 844, by a stand-alone printer, by CVT 852, etc. Some gaming establishments will not have a cashout kiosk 844. Instead, a cashout ticket could be redeemed for cash by a cashier (e.g. of a convenience store), by a gaming machine or by a specially configured CVT.

Information relevant to managing gaming networks, data communication within gaming networks, etc., is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES" and in U.S. patent application Ser. No. 11/173,442 by Kinsley et al., filed Jul. 1, 2005 and entitled "METHODS AND DEVICES FOR DOWNLOADING GAMES OF CHANCE," all of which are hereby incorporated by reference in their entirety and for all purposes. Some examples of gaming networks and devices are set forth below.

Figure 9:
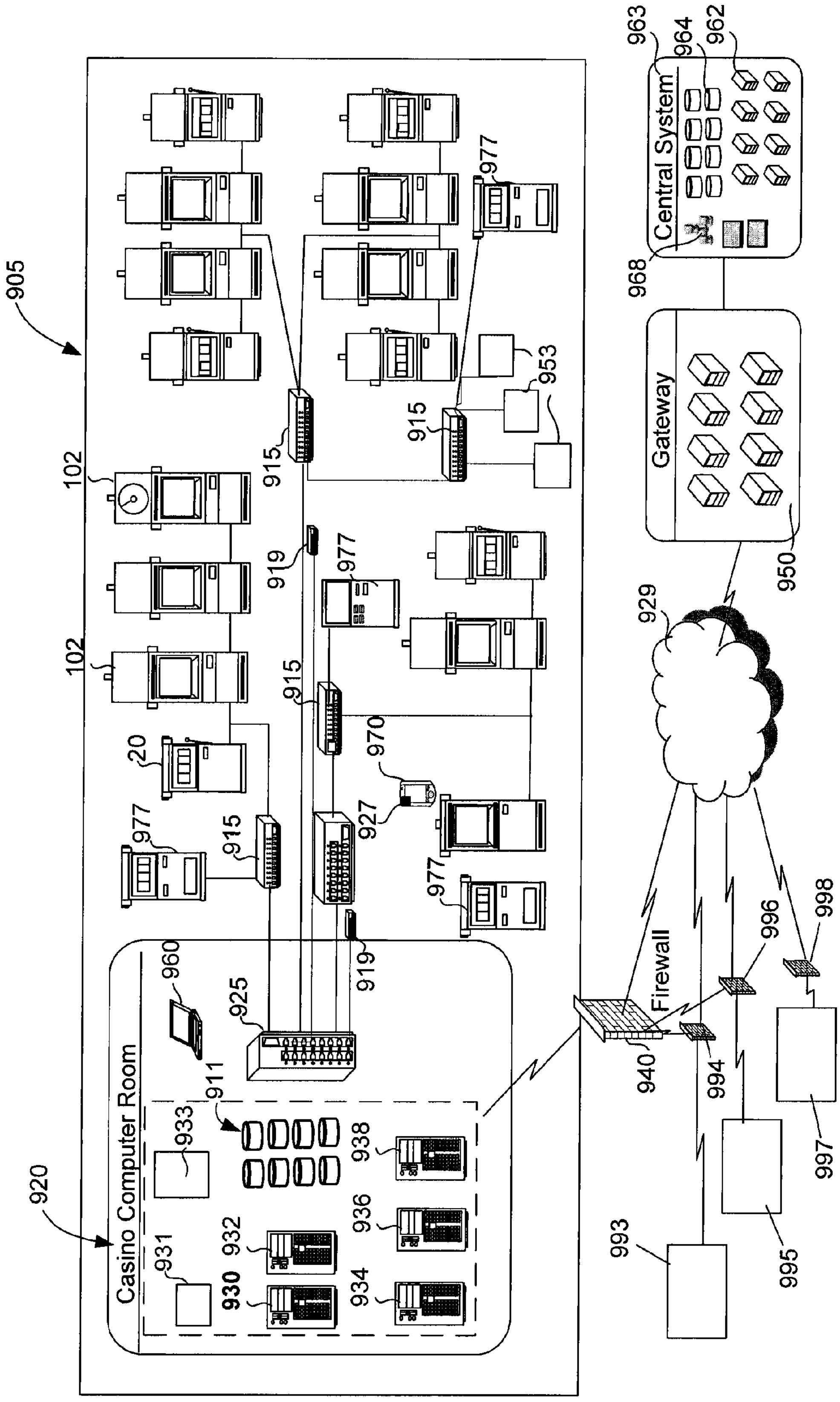
FIG. 9 depicts a simplified example of a server-based gaming network that may be used to implement, at least in part, some aspects of the invention.

Another example of a network topology for implementing some aspects of the present invention is shown in FIG. 9. Those of skill in the art will realize that this exemplary architecture and the related functionality are merely examples and that the present invention encompasses many other such embodiments and methods. Here, for example, a single gaming establishment 905 is illustrated, which is a casino in this example. However, it should be understood that some implementations of the present invention involve multiple gaming establishments.

Gaming establishment 905 includes 16 gaming machines 102, each of which is part of a bank 610 of gaming machines 102. In this example, gaming establishment 905 also includes a bank of networked gaming tables 953. It will be appreciated that many gaming establishments include hundreds or even thousands of gaming machines 102 and/or gaming tables 953, not all of which are included in a bank. However, the present invention may be implemented in gaming establishments having any number of gaming machines, gaming tables, etc.

Various alternative network topologies can be used to implement different aspects of the invention and/or to accommodate varying numbers of networked devices. For example, gaming establishments with very large numbers of gaming machines 102 may require multiple instances of some network devices (e.g., of main network device 925, which combines switching and routing functionality in this example) and/or the inclusion of other network devices not shown in FIG. 9. For example, some implementations of the invention include one or more middleware servers disposed between gaming machines 102 and server 930. Such middleware servers can provide various useful functions, including but not limited to the filtering and/or aggregation of data received from bank switches 915, from individual gaming machines and from other player terminals. Some implementations of the invention include load balancing methods and devices for managing network traffic.

Each bank 910 has a corresponding bank switch 915, which may be a conventional bank switch. Each bank switch is connected to server-based gaming ("SBG") server 930 via main network device 925, which combines switching and routing functionality in this example. Although various floor communication protocols may be used, some preferred implementations use IGT's open, Ethernet-based SuperSAS® protocol, which IGT makes available for downloading without charge. However, other protocols such as Best of Breed ("BOB") may be used to implement various aspects of SBG. IGT has also developed a gaming-industry-specific transport layer called CASH that rides on top of TCP/IP and offers additional functionality and security.

SBG server 930, License Manager 931, Arbiter 933, servers 932, 934, 936 and 938, and main network device 925 are disposed within computer room 920 of gaming establishment 905. In practice, more or fewer servers may be used. Some of these servers may be configured to perform tasks relating to player loyalty and/or player tracking, bonusing/progressives, etc. One or more servers (as well as other devices) may be configured to perform tasks specific to the present invention, such as player community management.

License Manager 931 may also be implemented, at least in part, via a server or a similar device. Some exemplary operations of License Manager 931 are described in detail in U.S. patent application Ser. No. 11/225,408, entitled "METHODS AND DEVICES FOR AUTHENTICATION AND LICENSING IN A GAMING NETWORK" by Kinsley et al., which is hereby incorporated by reference.

SBG server 930 can also be configured to implement, at least in part, various aspects of the present invention. Some preferred embodiments of SBG server 930 and the other servers shown in FIG. 9 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 931, servers 932, 934, 936 and 938, and main network device 925) are mounted in a single rack with SBG server 930. Accordingly, many or all such devices will sometimes be referenced in the aggregate as an "SBG server." However, in alternative implementations, one or more of these devices is in communication with SBG server 930 and/or other devices of the network but located elsewhere. For example, some of the devices could be mounted in separate racks within computer room 920 or located elsewhere on the network. For example, it can be advantageous to store large volumes of data elsewhere via a storage area network ("SAN").

In some embodiments, these components are SBG server 930 preferably has an uninterruptible power supply ("UPS"). The UPS may be, for example, a rack-mounted UPS module.

Computer room 920 may include one or more operator consoles or other host devices that are configured for communication with SBG server 930. Such host devices may be provided with software, hardware and/or firmware for implementing various aspects of the invention; many of these aspects involve controlling SBG server 930. However, such host devices need not be located within computer room 920. Wired host device 960 (which is a laptop computer in this example) and wireless host device (which is a PDA in this example) may be located elsewhere in gaming establishment 905 or at a remote location.

Arbiter 933 may be implemented, for example, via software that is running on a server or another networked device. Arbiter 933 serves as an intermediary between different devices on the network. Some implementations of Arbiter 933 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 933 is a repository for the configuration information required for communication between devices on the gaming network (and, in some implementations, devices outside the gaming network). Although Arbiter 933 can be implemented in various ways, one exemplary implementation is discussed in the following paragraphs.

Figure 10:
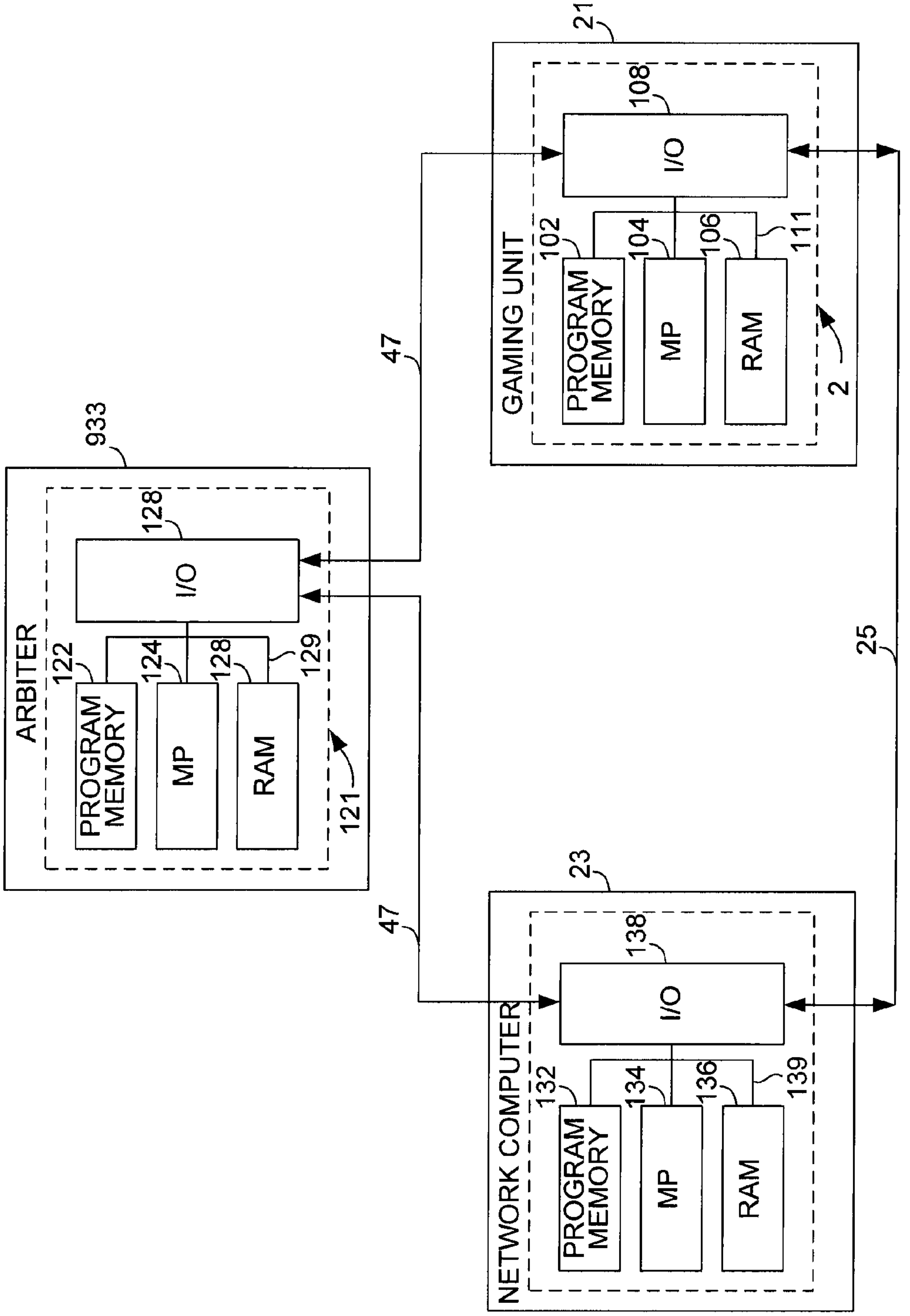
FIG. 10 is a block diagram of an Arbiter that may be used to implement, at least in part, some aspects of the invention.

FIG. 10 is a block diagram of a simplified communication topology between a gaming unit 21, the network computer 23 and the Arbiter 933. Although only one gaming unit 21, one network computer 23 and one Arbiter 933 are shown in FIG. 10, it should be understood that the following examples may be applicable to different types of network gaming devices within the gaming network 12 beyond the gaming unit 21 and the network computer 23, and may include different numbers of network computers, gaming security arbiters and gaming units. For example, a single Arbiter 933 may be used for secure communications among a plurality of network computers 23 and tens, hundreds or thousands of gaming units 21. Likewise, multiple gaming security arbiters 46 may be utilized for improved performance and other scalability factors.

Referring to FIG. 10, the Arbiter 933 may include an arbiter controller 121 that may comprise a program memory 122, a microcontroller or microprocessor (MP) 124, a random-access memory (RAM) 126 and an input/output (I/O) circuit 128, all of which may be interconnected via an address/data bus 129. The network computer 23 may also include a controller 131 that may comprise a program memory 132, a microcontroller or microprocessor (MP) 134, a random-access memory (RAM) 136 and an input/output (I/O) circuit 138, all of which may be interconnected via an address/data bus 139. It should be appreciated that although the Arbiter 933 and the network computer 23 are each shown with only one microprocessor 124, 134, the controllers 121, 131 may each include multiple microprocessors 124, 134. Similarly, the memory of the controllers 121, 131 may include multiple RAMs 126, 136 and multiple program memories 122, 132. Although the I/O circuits 128, 138 are each shown as a single block, it should be appreciated that the I/O circuits 128, 138 may include a number of different types of I/O circuits. The RAMs 124, 134 and program memories 122, 132 may be implemented as semiconductor memories, magnetically readable memories, and/or optically readable memories, for example.

Although the program memories 122, 132 are shown in FIG. 10 as read-only memories (ROM) 122, 132, the program memories of the controllers 121, 131 may be a read/write or alterable memory, such as a hard disk. In the event a hard disk is used as a program memory, the address/data buses 129, 139 shown schematically in FIG. 10 may each comprise multiple address/data buses, which may be of different types, and there may be an I/O circuit disposed between the address/data buses.

As shown in FIG. 10, the gaming unit 21 may be operatively coupled to the network computer 23 via the data link 25. The gaming unit 21 may also be operatively coupled to the Arbiter 933 via the data link 47, and the network computer 23 may likewise be operatively coupled to the Arbiter 933 via the data link 47. Communications between the gaming unit 21 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), game download information (e.g., game software and game licensing information) and personal information (e.g., social security number, personal preferences, etc.) may be encrypted with stronger encryption techniques such as DES or 3DES to provide increased security.

As disclosed in further detail in the Arbiter Application, the Arbiter 933 may verify the authenticity of each network gaming device. The Arbiter 933 may receive a request for a communication session from a network device. For ease of explanation, the requesting network device may be referred to as the client, and the requested network device may be referred to as the host. The client may be any device on the network 12 and the request may be for a communication session with any other network device. The client may specify the host, or the gaming security arbiter may select the host based on the request and based on information about the client and potential hosts. The Arbiter 933 may provide encryption keys (session keys) for the communication session to the client via the secure communication channel. Either the host and/or the session key may be provided in response to the request, or may have been previously provided. The client may contact the host to initiate the communication session. The host may then contact the Arbiter 933 to determine the authenticity of the client. The Arbiter 933 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 933 may contact the host regarding the request and provide corresponding session keys to both the client and the host. The Arbiter 933 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Wireless devices are particularly useful for managing a gaming network. Such wireless devices could include, but are not limited to, laptops, PDAs or even cellular telephones. Referring once again to FIG. 9, one or more network devices in gaming establishment 905 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, etc., while on the casino floor.

If a host device is located in a remote location, security methods and devices (such as firewalls, authentication and/or encryption) should be deployed in order to prevent the unauthorized access of the gaming network. Similarly, any other connection between gaming network 905 and the outside world should only be made with trusted devices via a secure link, e.g., via a virtual private network ("VPN") tunnel. For example, the illustrated connection between SBG 930, gateway 950 and central system 963 (here, IGT.com) that may be used for game downloads, etc., is advantageously made via a VPN tunnel.

An Internet-based VPN uses the open, distributed infrastructure of the Internet to transmit data between sites. A VPN may emulate a private IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, game downloading and game license management. This application has been incorporated herein by reference.

Providing a secure connection between the local devices of the SBG system and IGT's central system allows for the deployment of many advantageous features. For example, a customer (e.g., an employee of a gaming establishment) can log onto an account of central system 963 (in this example, IGT.com) to obtain the account information such as the customer's current and prior account status.

Moreover, such a secure connection may be used by the central system 963 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, etc. Such information includes, but is not limited to, information regarding the revenue attributable to particular games at specific times of day, days of the week, etc. Such information may be obtained, at least in part, by reference to an accounting system of the gaming network(s), as described in U.S. patent application Ser. No. 11/225,407, by Wolf et al., entitled "METHODS AND DEVICES FOR MANAGING GAMING NETWORKS," which has been incorporated herein by reference.

Automatic updates of a customer's SBG server may also be enabled. For example, central system 963 may notify a local SBG server regarding new products and/or product updates. For example, central system 963 may notify a local SBG server regarding updates of new gaming software, gaming software updates, peripheral updates, the status of current gaming software licenses, etc. In some implementations of the invention, central system 963 may notify a local SBG server (or another device associated with a gaming establishment) that an additional theme-specific data set and/or updates for a previously-downloaded global payout set are available. Alternatively, such updates could be automatically provided to the local SBG server and downloaded to networked gaming machines.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 963 in response to such a notification.

Secure communication links allow notifications to be sent securely from a local SBG server to host devices outside of a gaming establishment. For example, a local SBG server can be configured to transmit automatically generated email reports, text messages, etc., based on predetermined events that will sometimes be referred to herein as "triggers." Such triggers can include, but are not limited to, the condition of a gaming machine door being open, cash box full, machine not responding, verification failure, etc.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 963 and the gaming establishments.

Although many of the components and processes are described above in the singular for convenience, it will be appreciated by one of skill in the art that multiple components and repeated processes can also be used to practice the techniques of the present invention. Similarly, although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A gaming system, comprising:

a gaming device configured to allow a player to play wagering games thereon;

a location detection device configured to determine a location of the gaming device; and a server in communication with the gaming device and the location detection device and configured to:

determine a player community of a player based in part on a wagering game experience level and a risk wagering preference of the player, the wagering game experience level indicating an amount of experience that the player has in playing the wagering games and the risk wagering preferences indicating a preference for a type of pay model associated with the wagering games, select one or more of the wagering games and wagering game characteristics according to the player community and according to the location of the gaming device, and configure the gaming device to provide the one or more selected wagering games having the selected wagering game characteristics, wherein the selected wagering game characteristics include a volatility characteristic.

2. The gaming system of claim 1, wherein the selected wagering game characteristic further comprises at least one of a pay table percentage characteristic, a denomination characteristic and a wager game presentation characteristic.

3. The gaming system of claim 1, wherein the gaming device comprises a wager gaming machine.

4. The gaming system of claim 1, wherein determining the player community is further based on one or more criteria of player characteristic data.

5. The gaming system of claim 4, wherein one or more criteria of the player characteristic data comprise at least one of: total handle data, loyalty tier data, deposit data, stake per session data, tenure data, session number data, session frequency data, tournament fee data, games played data and account balance data.

6. The gaming system of claim 5, wherein the server is further configure to weight a first criterion of the plurality of criteria of the player characteristic data more heavily than a second criterion of the plurality of criteria of the player characteristic data.

7. The gaming system of claim 1, wherein determining the player community is further based on a type of wagering game.

8. The gaming system of claim 1, wherein the server is a server of a player loyalty system.

9. The gaming system of claim 1, wherein the server is further configured to perform the following tasks:

receive player identification data of the player and device information of the gaming device;

query a data structure comprising player identification data and corresponding player communities;

determine the player community according to the player identification data;

locate software corresponding to the player community and the device information; and download software to the device for providing the selected wagering games according to the selected wagering game characteristics.

10. The gaming system of claim 1, wherein the gaming device is a portable wager gaming machine.

11. The gaming system of claim 1, wherein the server comprises a user input device.

12. The gaming system of claim 1, wherein the server is further configured to:

apparatus for monitor at least one criterion of a wagering game history of the player; and apparatus for determine when the wagering game history of the player indicates that the player should be migrated from the player community to another player community.

13. The gaming system of claim 12, wherein the server is further configured to for cause the player to migrate from the player community corresponding to the one or more selected wagering games having the selected wagering game characteristics to the another player community corresponding to other wagering games having other wagering game characteristics.

14. The gaming system of claim 1, wherein the gaming device comprises a player loyalty card reader.

15. The gaming system of claim 1, wherein the selecting the one or more of the wagering games and the wagering game characteristics is further selected based on a type of the gaming device.

16. A gaming method, comprising:

determining a player community of a player based in part on a player identification data, a wagering game experience level and a risk wagering preference of the player, the wagering game experience level indicating an amount of experience that the player has in playing wagering games and the risk wagering preferences indicating a preference for a type of pay model associated with the wagering games;

determining a location of a device according to device information about the device, the device allowing the player to play the wagering games thereon;

selecting one or more of the wagering games and wagering game characteristics based on the player community and the location of the device; and configuring the device to provide the one or more selected wagering games having the selected wagering game characteristics, wherein the selected wagering game characteristics include a denomination characteristic.

17. The gaming method of claim 16, wherein the selected wagering game characteristic further comprises at least one of a volatility characteristic, a pay table percentage characteristic and a wager game presentation characteristic.

18. The gaming method of claim 16, wherein the device is a wager gaming machine.

19. The gaming method of claim 16, wherein the determining the player community further comprises determining player identification data corresponding to a player loyalty system.

20. The gaming method of claim 16, wherein determining the player community of the player is further based on one or more criteria of player characteristic data.

21. The gaming method of claim 20, wherein the one or more criteria of the player characteristic data comprise at least one: of total handle data, loyalty tier data, deposit data, stake per session data, tenure data, session number data, session frequency data, tournament fee data, games played data and account balance data.

22. The gaming method of claim 21, further comprising weighting a first criterion of the plurality of criteria of the player characteristic data more heavily than a second criterion of the plurality of criteria of the player characteristic data.

23. The gaming method of claim 16, wherein determining the player community of the player is further based on a type of wagering game.

24. The gaming method of claim 16, wherein the selecting step comprises:

receiving the player identification data and the device information;

determining the player community according to the player identification data;

locating software corresponding to the player community and the device information; and downloading software to the device for providing the one or more selected wagering games according to the selected wagering game characteristics.

25. The gaming method of claim 16, further comprising:

monitoring at least one criterion of a wagering game history of the player; and determining when the wagering game history of the player indicates that the player should be migrated from the player community to another player community.

26. The gaming method of claim 25, further comprising migrating the player from the player community corresponding to the one or more selected wagering games having the selected wagering game characteristics to the another player community corresponding to other wagering games having other wagering game characteristics.

27. A server, comprising:

a network interface system configured to receive player identification data and gaming device identification data from a gaming device that allows a player to play wagering games thereon, the gaming device identification data including device location data of the location of the gaming device;

a memory system configured to store the player identification data, player community data, gaming device identification data and player community software;

a logic system configured to:

determine a player community based in part on the player identification data, a wagering game experience level and a risk wagering preference of the player, the wagering game experience level indicating an amount of experience that the player has in playing the wagering games and the risk wagering preferences indicating a preference for a type of pay model associated with the wagering games;

locate player community software corresponding to the player community and the gaming device identification data, the player community software configured to provide selected wagering games of the wagering games according to selected wagering game characteristics, wherein the selected wagering game characteristics include a volatility characteristic; and download the player community software to the gaming device, via the network interface system.

28. The server of claim 27, wherein the selected wagering game characteristic further comprises at least one of a pay table percentage characteristic, a denomination characteristic and a wager game presentation characteristic.

* * * * *

UNITED STATES PATENT AND TRADEMARK OFFICE

CERTIFICATE OF CORRECTION

PATENT NO. : 8,460,109 B2
APPLICATION NO. : 11/739661
DATED : June 11, 2013
INVENTOR(S) : Andy O. Bryson et al.

It is certified that error appears in the above-identified patent and that said Letters Patent is hereby corrected as shown below:

IN THE CLAIMS

In Claim 1, Column 38, Line 10, replace “preferences” with --preference--.
In Claim 2, Column 38, Line 22, replace “characteristic” with --characteristics-- and “comprises” with --comprise--.
In Claim 5, Column 38, Line 30, between “wherein” and “one” insert --the--.
In Claim 5, Column 38, Line 31, delete “the”.
In Claim 6, Column 38, Line 38, replace “configure” with --configured-- and replace “plurality of” with --one or more--.
In Claim 6, Column 38, Line 39, delete “the”.
In Claim 6, Column 38, Line 40, replace “plurality of” with --one or more-- and delete the second instance of “the”.
In Claim 9, Column 38, Line 57, between “download” and “software” insert --the--.
In Claim 12, Column 38, Line 66, delete “apparatus for”.
In Claim 12, Column 39, Line 1, delete “apparatus for”.
In Claim 13, Column 39, Line 6, delete “for”.
In Claim 13, Column 39, Line 9, replace “another” with --other--.
In Claim 15, Column 39, Line 14, delete “the selecting”.
In Claim 15, Column 39, Line 16, Replace “is” with --are--.
In Claim 16, Column 39, Line 24, replace “preferences” with --preference--.
In Claim 17, Column 39, Line 38, replace “characteristic” with --characteristics-- and “comprises” with --comprise--.
In Claim 19, Column 39, Line 44, after “determining” insert --the--.
In Claim 21, Column 39, Line 51, delete “the”.
In Claim 22, Column 39, Line 57, replace “plurality of” with --one or more-- and delete the second instance of “the”.
In Claim 22, Column 39, Line 59, replace “plurality of” with --one or more-- and delete the second instance of “the”.
In Claim 24, Column 40, Line 12, between “downloading” and “software” insert --the--.

Signed and Sealed this
Twenty-fourth Day of September, 2013

Teresa Stanek Rea

Teresa Stanek Rea
*Deputy Director of the United States Patent and Trademark Office*

IN THE CLAIMS

In Claim 26, Column 40, Line 24, replace “another” with --other--.
In Claim 27, Column 40, Line 32, replace the first instance of “the” with --a--.
In Claim 27, Column 40, Line 35, between “data,” and “gaming” insert --the--.
In Claim 27, Column 40, Line 36, after “software;” insert --and--.
In Claim 27, Column 40, Lines 43–44, replace “preferences” with --preference--.
In Claim 28, Column 40, Line 56, replace “characteristic” with --characteristics-- and “comprises” with --comprise--.

UNITED STATES PATENT AND TRADEMARK OFFICE

CERTIFICATE OF CORRECTION

PATENT NO. : 8,460,109 B2
APPLICATION NO. : 11/739661
DATED : June 11, 2013
INVENTOR(S) : Bryson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1568 days.

Signed and Sealed this
Thirtieth Day of December, 2014

Michelle K. Lee
*Deputy Director of the United States Patent and Trademark Office*